US008549547B2

(12) United States Patent
Onagi et al.

(10) Patent No.: US 8,549,547 B2
(45) Date of Patent: Oct. 1, 2013

(54) DISK CLAMPING MECHANISM AND DISK DRIVE SYSTEM, WITH MOVABLY SUPPORTED CLAMPER

(75) Inventors: Nobuaki Onagi, Kanagawa (JP); Yasutomo Aman, Kanagawa (JP); Haruki Tokumaru, Tokyo (JP); Yoshimichi Takano, Tokyo (JP); Daiichi Koide, Tokyo (JP); Takeshi Kajiyama, Tokyo (JP); Masami Nishida, Saitama (JP)

(73) Assignees: Ricoh Company, Ltd., Tokyo (JP); Chotaro Engineering Co., Saitama (JP)

(*) Notice: Subject to any disclaimer, the term of this patent is extended or adjusted under 35 U.S.C. 154(b) by 246 days.

(21) Appl. No.: 12/882,949

(22) Filed: Sep. 15, 2010

(65) Prior Publication Data
US 2011/0072446 A1 Mar. 24, 2011

(30) Foreign Application Priority Data

Sep. 24, 2009 (JP) ................. 2009-219038
Sep. 24, 2009 (JP) ................. 2009-219051

(51) Int. Cl.
*G11B 17/04* (2006.01)
*G11B 17/03* (2006.01)

(52) U.S. Cl.
USPC ............................ 720/604; 720/697; 720/712

(58) Field of Classification Search
USPC .......... 720/600, 601, 603–605, 695, 703–717
See application file for complete search history.

(56) References Cited

U.S. PATENT DOCUMENTS

| 5,537,281 | A | 7/1996 | Ma et al. |
| 5,926,452 | A * | 7/1999 | Park ............................. 720/706 |
| 2002/0009036 | A1 | 1/2002 | Omori |
| 2005/0010942 | A1* | 1/2005 | Kim et al. .................... 720/706 |
| 2005/0015782 | A1* | 1/2005 | Wang ........................... 720/603 |
| 2006/0051076 | A1 | 3/2006 | Aman et al. |

(Continued)

FOREIGN PATENT DOCUMENTS

| EP | 1 998 327 A2 | 12/2008 |
| JP | 2001-520788 A | 10/2001 |

(Continued)

OTHER PUBLICATIONS

Takano, Y., "Thin Optical Disk" English Translation of NHK Giken-Dayori No. 42, Sep. 2008, R&D, 5 pages. (http://www.nhk.or.jp/strl/publica/giken_dayori/jp2/rd-0809.html).

(Continued)

*Primary Examiner* — Nathan Danielsen
(74) *Attorney, Agent, or Firm* — Dickstein Shapiro LLP

(57) ABSTRACT

A disclosed disk clamping mechanism includes a turntable fixed on a rotational shaft of a spindle motor to rotate a flexible thin optical disk, a stabilizer member configured to suppress a run-out of the flexible thin optical disk by an applying aerodynamic force to the rotating flexible thin optical disk so as to stabilize the run-out of the rotating flexible thin optical disk, and a clamper movably supported in a center of the stabilizer member in a direction perpendicular to a surface of the flexible thin optical disk. In the disclosed disk clamping mechanism, the flexible thin optical disk is sandwiched between the turntable and the clamper such that the turntable and the clamper rotate the flexible thin optical member sandwiched in-between.

10 Claims, 30 Drawing Sheets

(56) References Cited

U.S. PATENT DOCUMENTS

| | | | |
|---|---|---|---|
| 2007/0130578 A1* | 6/2007 | Ido et al. | 720/703 |
| 2008/0117726 A1* | 5/2008 | Yoshida et al. | 369/30.28 |
| 2008/0301720 A1* | 12/2008 | Yamauchi et al. | 720/601 |

FOREIGN PATENT DOCUMENTS

| | | |
|---|---|---|
| JP | 2003-223755 A | 8/2003 |
| JP | 2004-139659 A | 5/2004 |
| JP | 2006-107698 A | 4/2006 |
| JP | 2007-287243 | 11/2007 |
| JP | 2008-10050 A | 1/2008 |
| JP | 2008-186552 A | 8/2008 |
| JP | 4205679 B2 | 10/2008 |
| JP | 2009-176333 | 8/2009 |
| WO | WO 2009/116333 A1 | 9/2009 |

OTHER PUBLICATIONS

Aman, Y., "High Speed Flexible Optical Disk with Cylindrically Concaved Stabilizer" Japanese Journal of Applied Physics, vol. 46, No. 6B, 2007, pp. 3750-3754, Published Jun. 22, 2007.

* cited by examiner

MOVEMENT DIRECTIONS
OF TRAY-STABILIZER
COMBINED MEMBER

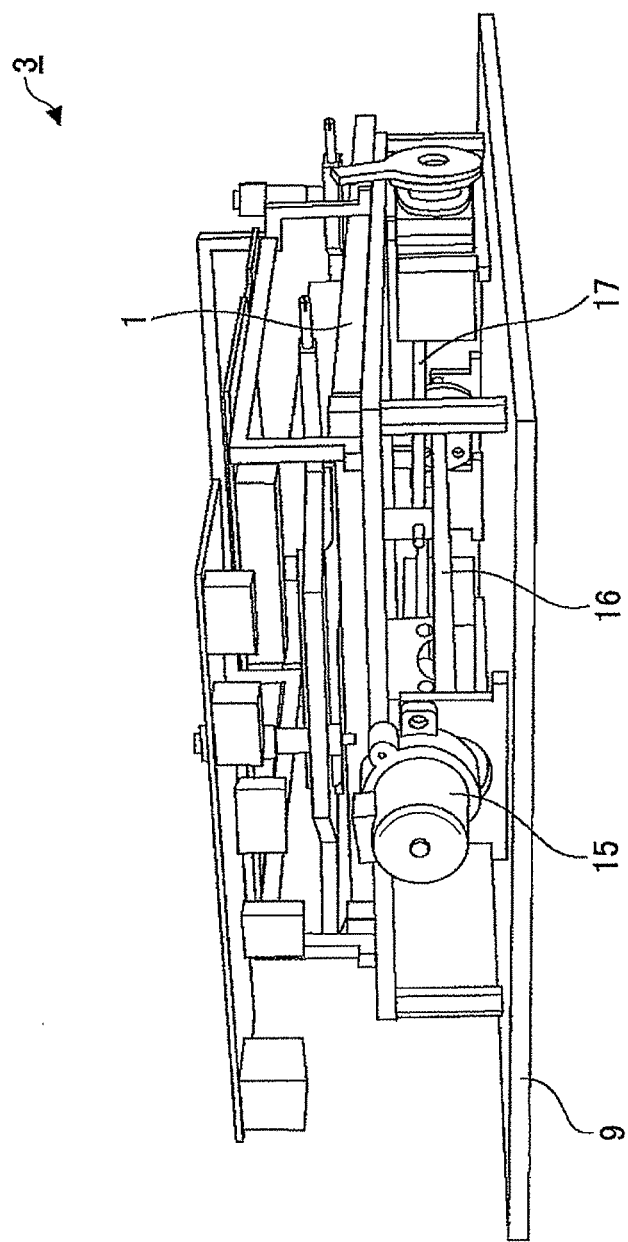

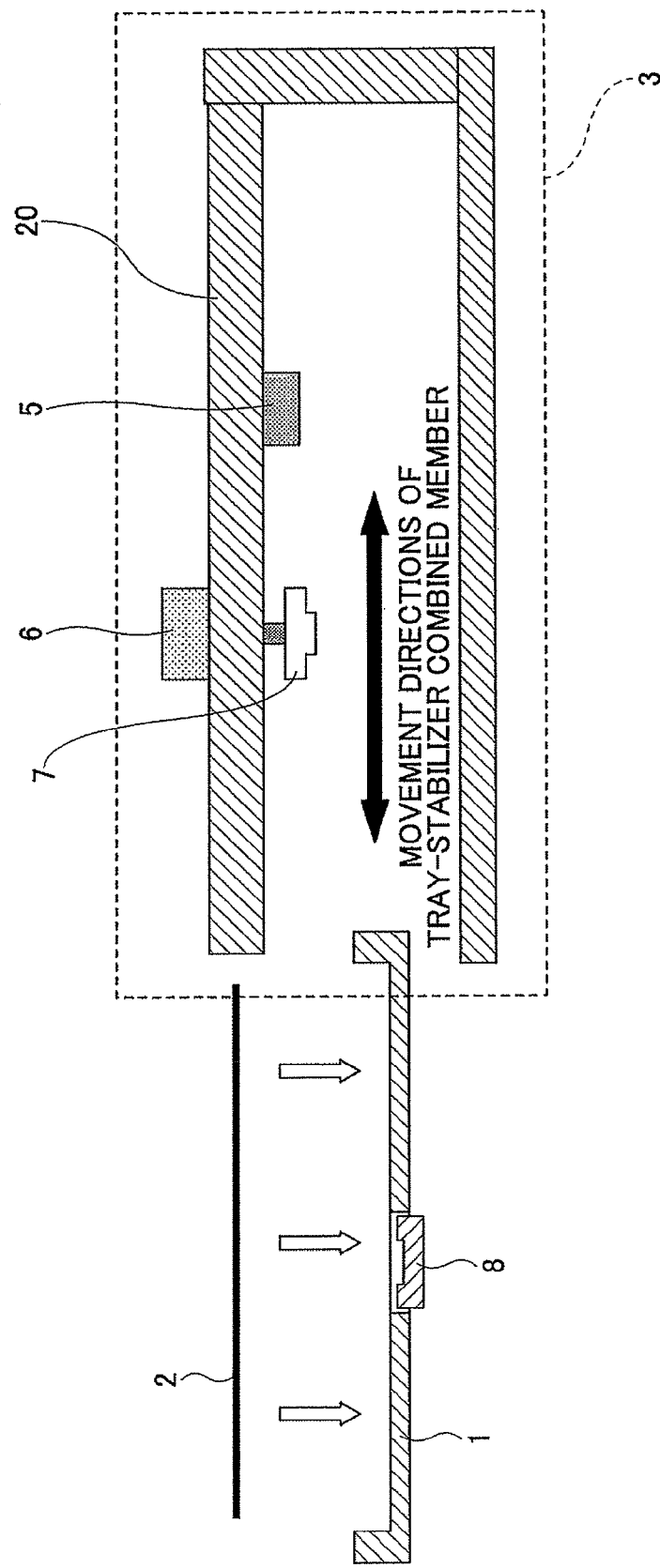

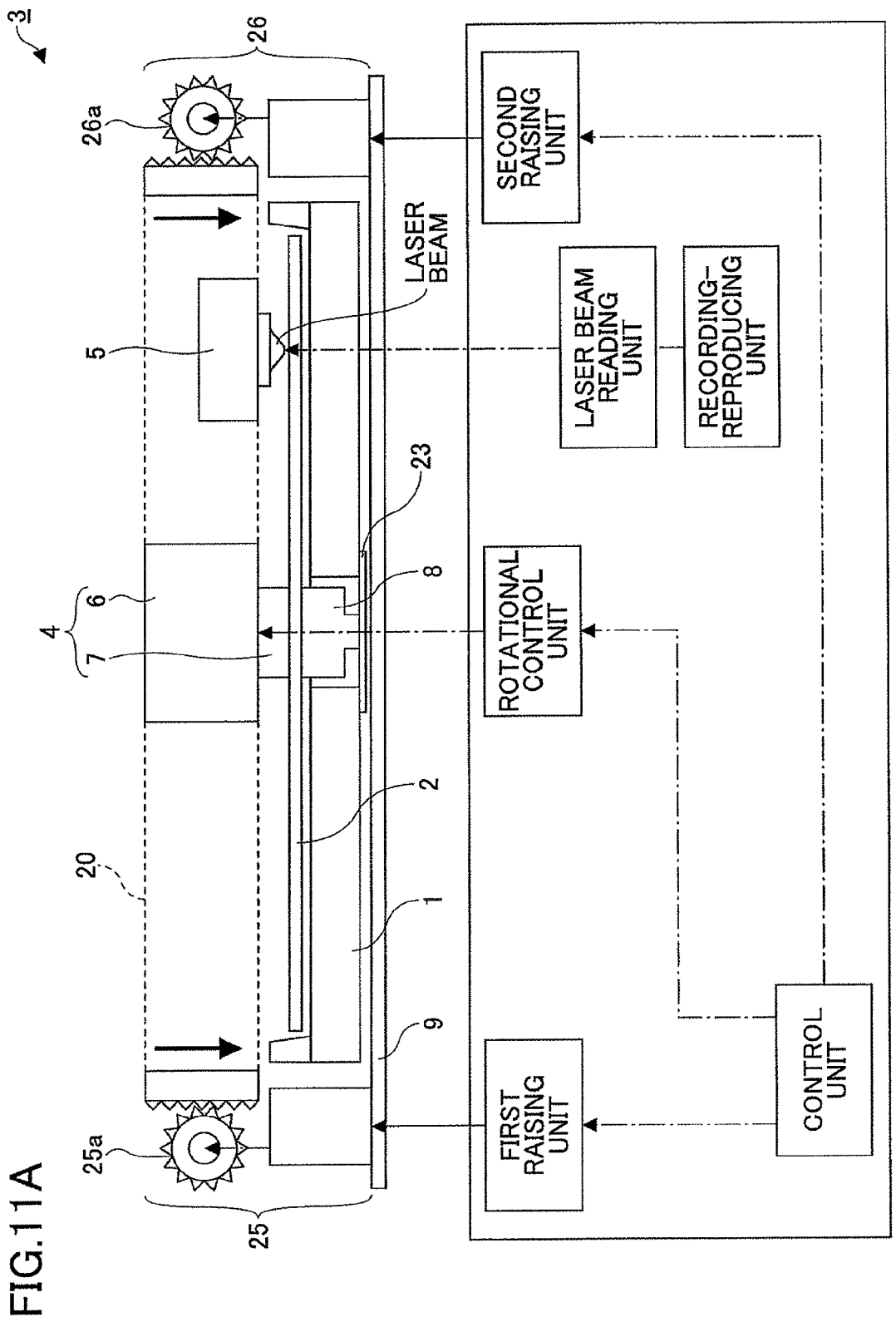

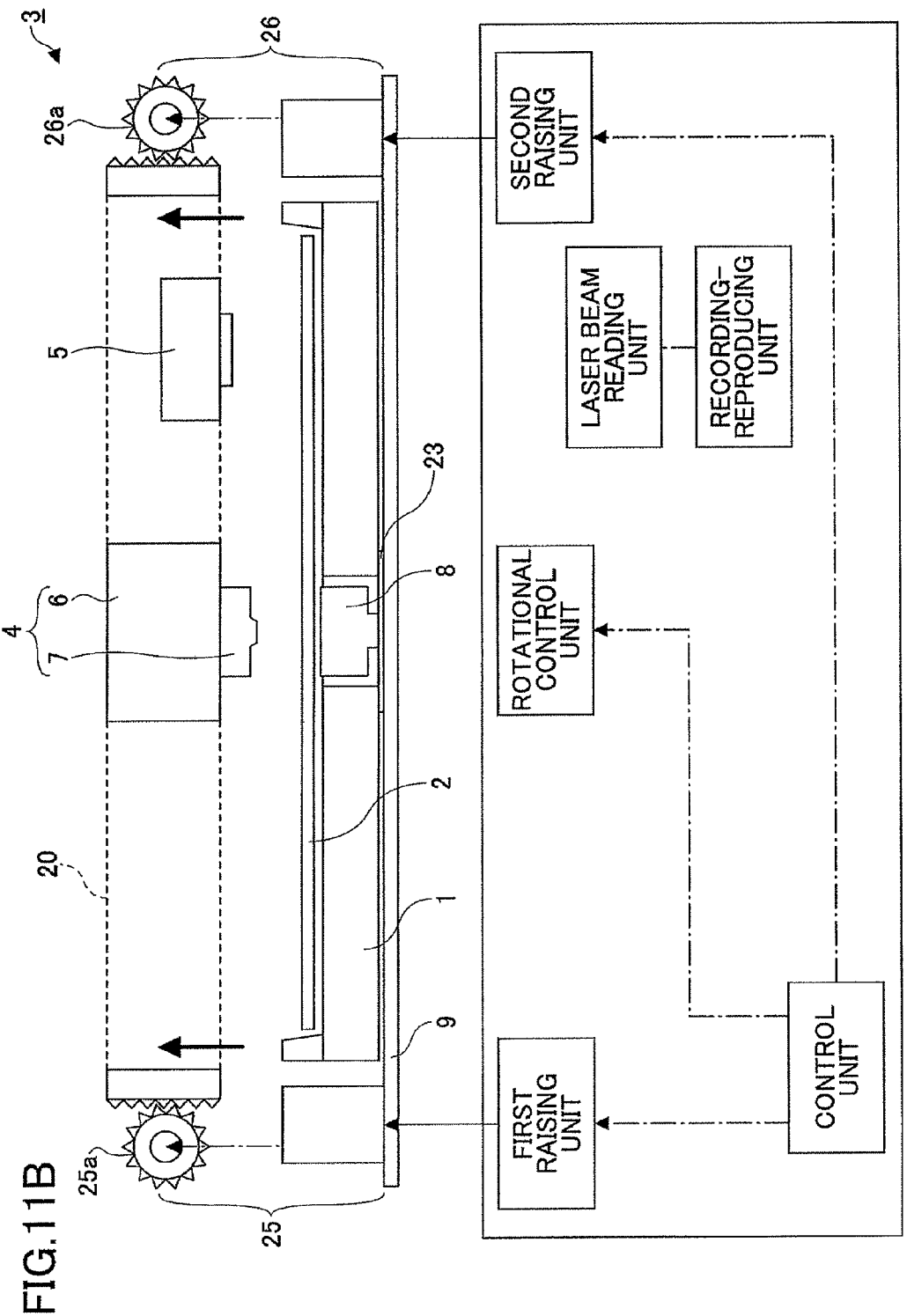

DISK CLAMPING MECHANISM AND DISK DRIVE SYSTEM, WITH MOVABLY SUPPORTED CLAMPER

BACKGROUND OF THE INVENTION

1. Field of the Invention

The invention generally relates to a disk drive system and a clamping mechanism for use in a recording-reproducing apparatus for recording or reproducing information. More specifically, the invention relates to a disk drive system and a clamping mechanism capable of applying an aerodynamic force to a rotating flexible thin optical disk using a stabilizer to suppress a surface run-out of the flexible thin optical disk while rotating the flexible thin optical disk and stabilize the surface run-out of the rotating flexible thin optical disk.

2. Description of the Related Art

A related-art recording-reproducing apparatus for an optical disk generally includes a spindle motor having a shaft and a turntable fixed on the shaft. In the related-art recording-reproducing apparatus, the optical disk placed on the turntable is rotated while recording information on the optical disk or retrieving the information from the optical disk. More specifically, in the recording-reproducing apparatus, a ring-shaped hole is provided in the center of the turntable and a ring-shaped magnet is provided in the hole. The ring-shaped magnet is designed to attract a metallic clamper (e.g., clamper made of metallic plates) suspended from a supporting angle inside the recording-reproducing apparatus, thereby clamping (sandwiching) the optical disk between the turntable and the clamper. With the above related art configuration of the recording-reproducing apparatus, the optical disk is supported in a direction of a disk placing surface of the turntable.

With the related art configuration, it is possible to clamp a thin-film shaped optical disk having a thickness of 0.3 mm or less (hereinafter called a "thin optical disk") between the turntable and the clamper; however, it may be difficult to stably rotate the thin optical disk clamped between the turntable and the clamper. Recently, Japanese Patent Application Publication No. 2006-107698 (hereinafter referred to as Patent Document 1) has disclosed a recording-reproducing apparatus capable of stably rotating the thin optical disk using a so-called stabilizer. Accordingly, it is desired to provide a disk drive system having a stabilizing mechanism serving as both a tray and the stabilizer and a clamping mechanism, and having an exceedingly compact configuration.

It is desirable that the disk drive system for the flexible thin optical disk have a stabilizer to apply aerodynamic force to the rotating flexible thin optical disk so that the flexible thin optical disk is stably driven by suppressing the surface run-out of the rotating flexible thin optical disk. Further, it is also desirable to have a sufficient space for allowing air to flow at a side opposite to a stabilizer facing surface of the flexible thin optical disk in order to securely obtain the effect of the stabilizer.

FIGS. 14 through 16 are views illustrating configuration examples of the related art disk drive system for the thin optical disk disclosed in NHK GIKEN-DAYORI No. 42, 2008.09, R&D "Thin Optical Disk" (hereinafter referred to as Non-Patent Document 1) available via http://www.nhk.or.jp/strl/publica/giken dayori/jp2/rd-0809.html. In these examples, a commercially available tray is added to the disk drive system disclosed in the Non-Patent Document 1.

As illustrated in FIG. 14, a tray 1a currently outwardly ejected for placing a not-shown thin optical disk is moved from and into the disk drive system in directions indicated by a bidirectional arrow. In FIG. 15, the tray 1a having the thin optical disk (not-shown) is received inside the disk drive system where the tray 1a having the thin optical disk is moved under a tilted stabilizing plate 1b in directions showing movements of the tilted stabilizing plate 1b indicated by a bidirectional arrow. Note that the tray 1a includes a cutout portion 1c (see FIG. 14) extending to its center portion such that a turntable 7 and an optical pick up unit 5 do not interfere with each other.

As illustrated in FIG. 16, when the tray 1a having the thin optical disk is moved inside the disk drive system (i.e., closed) and the stabilizing plate 1b is lowered, the thin optical disk is clamped with a not-shown clamper, thereby starting to rotate the thin optical disk. However, in order to further obtain the effect of a stabilizing plate 1b, operations such as raising the turntable 7 to which the thin optical disk is clamped by the clamper are carried out for providing a space for allowing the air to flow in various directions. Accordingly, the thin optical disk may be stably rotated based on the effect of the stabilizing plate 1b.

Japanese Patent Application Publication No. 2003-223755 (hereinafter referred to as Patent Document 2) discloses a disk device that includes a disk holder at the center of a disk tray such that not only a standard circular optical disk such as a CD or a DVD but also a noncircular disk such as a card-shaped disk can be precisely mounted at the center of the disk tray. In this example, the above described related art clamping technology is applied for clamping the optical disk in the disk tray.

However, as illustrated in FIGS. 14 through 16, the disk drive system in which the thin optical disk is loaded or unloaded with the tray additionally includes the stabilizing plate 1b, a mechanism for moving the stabilizing plate 1b, and a mechanism for providing a space for efficiently moving the stabilizing plate 1b, which are otherwise unnecessary for an optical disk having an ordinary thickness. Accordingly, the configuration of the disk drive system for the thin optical disk may become complex and thus it may be difficult to make the disk drive system thinner. Further, there may not so far have been proposed a disk drive system in which the thin optical disk is loaded or unloaded with a tray and the tray is provided with a stabilizer for stably rotating the thin optical disk.

SUMMARY OF THE INVENTION

It is a general object of the disclosure to provide a novel and useful clamping mechanism and a thin optical disk drive system in which one or more of the aforementioned problems are eliminated. A more specific object is to provide a clamping mechanism for use in a recording-reproducing apparatus capable of carrying out recording or reproducing of information on a flexible thin optical disk in which a tray is combined with a stabilizer member for making the disk drive system thinner, the flexible thin optical disk is rotated without allowing the flexible thin optical disk to slidably contact the stabilizer member, and the flexible thin optical disk is moved closer to the stabilizer member when the rotation of the thin flexible optical disk is stabilized such that the flexible thin optical disk is clamped while carrying out recording or reproducing of information on the flexible thin optical disk.

Further, another specific object is to provide a thin disk drive system for use in a recording-reproducing apparatus capable of carrying out recording or reproducing of information on a flexible thin optical disk in which a tray is combined with a stabilizer member for making the disk drive system thinner, a run-out of the rotating flexible thin optical disk is suppressed and stabilized such that recording or reproducing of information is accurately carried out on the flexible thin optical disk, and loading/unloading of the flexible thin optical disk is easily carried out.

According to one embodiment, there is provided a disk clamping mechanism including a turntable fixed on a rotational shaft of a spindle motor to rotate a flexible thin optical disk; a stabilizer member configured to suppress a run-out of the flexible thin optical disk by applying an aerodynamic force to the rotating flexible thin optical disk so as to stabilize the run-out of the rotating flexible thin optical disk; and a clamper movably supported in a center of the stabilizer member in a direction perpendicular to a surface of the flexible thin optical disk, where the flexible thin optical disk is sandwiched between the turntable and the clamper such that the turntable and the clamper rotate the flexible thin optical member sandwiched in-between.

According to another embodiment, there is provided a disk drive system including the above disk clamping mechanism, where when the rotation of the flexible thin optical disk is stabilized, the flexible thin optical disk is moved closer to the stabilizer member to suppress the run-out of the flexible thin optical disk such that recording or reproducing of information is stably carried out on the flexible thin optical disk.

According to another embodiment, there is provided a disk drive system including a drive unit including a rotational shaft for holding a flexible thin optical disk and configured to rotate the flexible thin optical disk while holding the flexible thin optical disk; a stabilizer member configured to suppress a run-out of the flexible thin optical disk by applying an aerodynamic force to the rotating flexible thin optical disk such that at least one of recording and reproducing of information is stably carried out on the flexible thin optical disk; and a load/unload mechanism configured to move the stabilizer member arranged beneath the flexible thin optical disk in a direction approximately parallel to a disk placing surface of the stabilizer member while the flexible thin optical disk is placed on the stabilizer member such that the flexible thin optical disk is loaded inside or unloaded outside of the disk drive system.

BRIEF DESCRIPTION OF THE DRAWINGS

Other objects and further features of embodiments will be apparent from the following detailed description when read in conjunction with the accompanying drawings, in which:

FIGS. 1B and 1C are schematic perspective views illustrating configurations of a load/unload mechanism of the disk drive system according to the first embodiment;

FIGS. 4A, 4B, and 4C are sectional views illustrating a sequence of operations of a clamping mechanism in the disk drive system according to the embodiment;

FIGS. 11A and 11B are sectional views respectively illustrating first and second drive units provided one at each end of the disk drive system according to the embodiment when the thin optical disk rotation is stabilized, and the first and the second drive units when the thin optical disk rotation is stopped;

DESCRIPTION OF THE PREFERRED EMBODIMENTS

In the following, preferred embodiments of the present invention will be described with reference to the accompanying drawings.

Figure 1A:
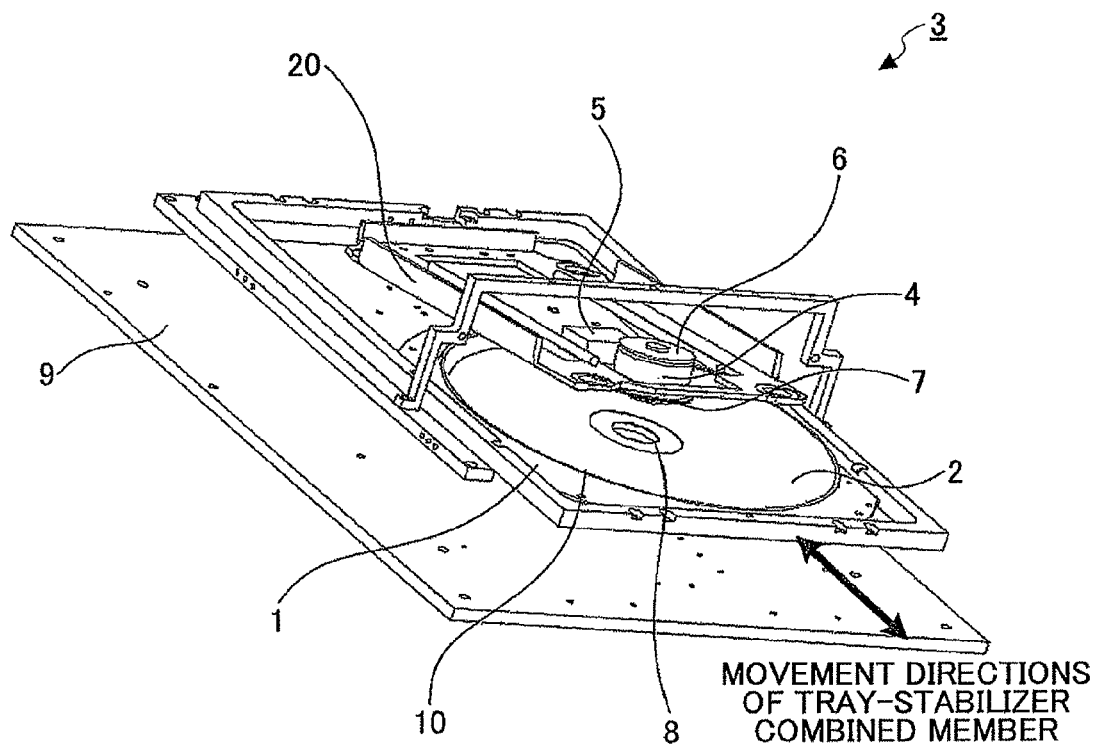
FIG. 1A is a schematic perspective view illustrating a configuration of a disk drive system according to an embodiment.

FIG. 1A is a schematic perspective view illustrating a configuration of the disk drive system 3 according to an embodiment. As illustrated in FIG. 1A, a disk drive system 3 loads a thin optical disk 2 inside a case 9 and unloads outside the case 9 by moving a tray-stabilizer combined member 1 in directions indicated by a bidirectional arrow that illustrates movements of the tray-stabilizer combined member 1. A spindle unit 4 configured to rotate the thin optical disk 2 includes a spindle motor 6 and a turntable 7. A clamper 8 is rotationally connected and supported on the tray-stabilizer combined member 1 with a sufficient space by a not-shown supporting member formed of an elastic member.

Figure 1C:
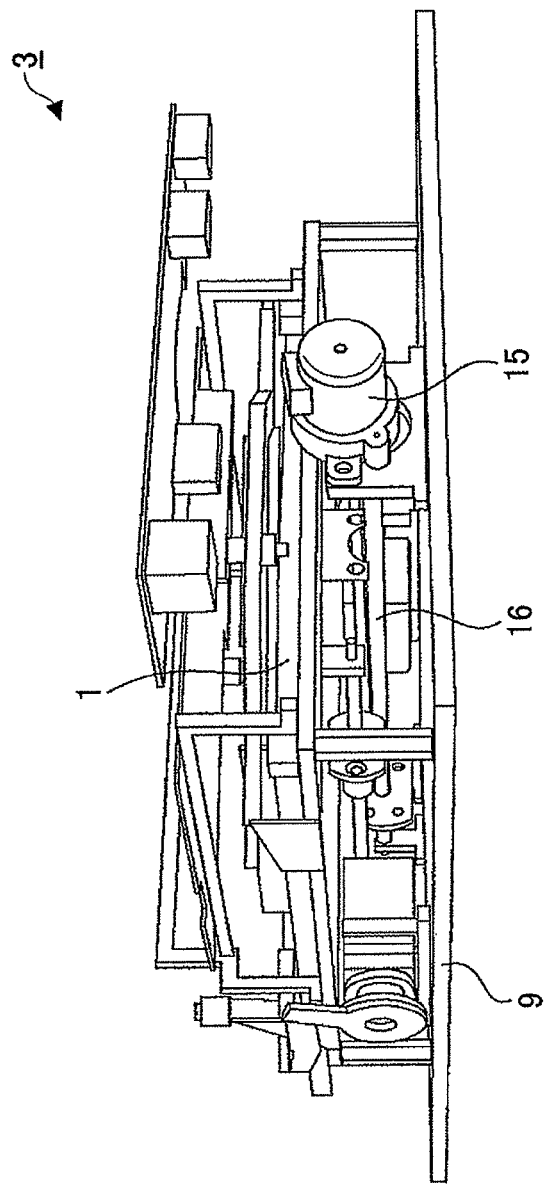

FIGS. 1B and 1C illustrate a drive system of the disk drive system 3 respectively viewed from left and right sides of the drive system by which the tray-stabilizer combined member 1 is moved inside and outside of the disk drive system 3 to load/unload the thin optical disk 2. In FIGS. 1B and 1C, the tray-stabilizer combined member 1, which is guided along a rail 17 by a worm gear 16 when a tray drive motor 15 is rotated, is moved in the directions illustrated in FIG. 1A.

Figure 2A:
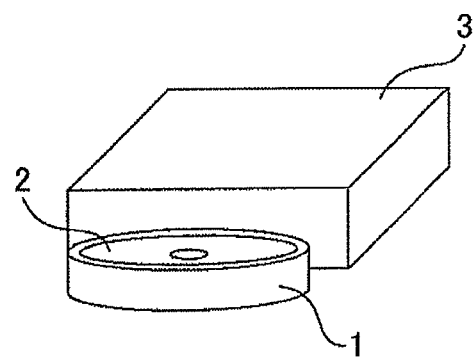
FIGS. 2A and 2B are a perspective view and a side view of a tray-stabilizer combined member arranged in the disk drive system according to the embodiment when a thin optical disk is unloaded.
Figure 2B:
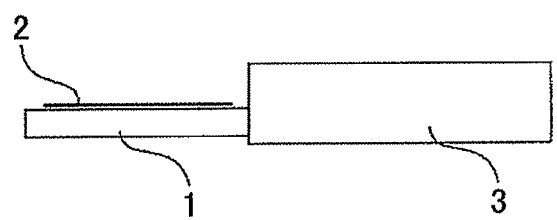
Figure 2C:
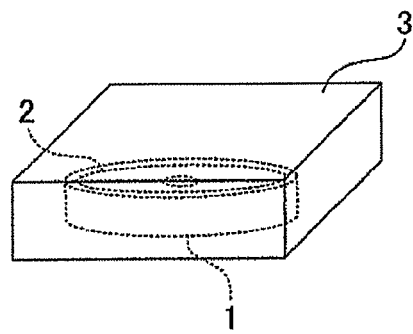
FIGS. 2C, 2D, and 2E are respectively a perspective view, a side view, and a transparent side view of the tray-stabilizer combined member when the thin optical disk is loaded.
Figure 2D:
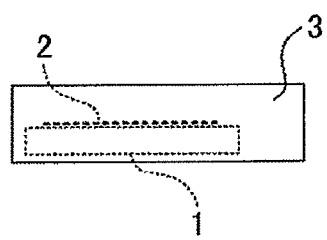
Figure 2E:
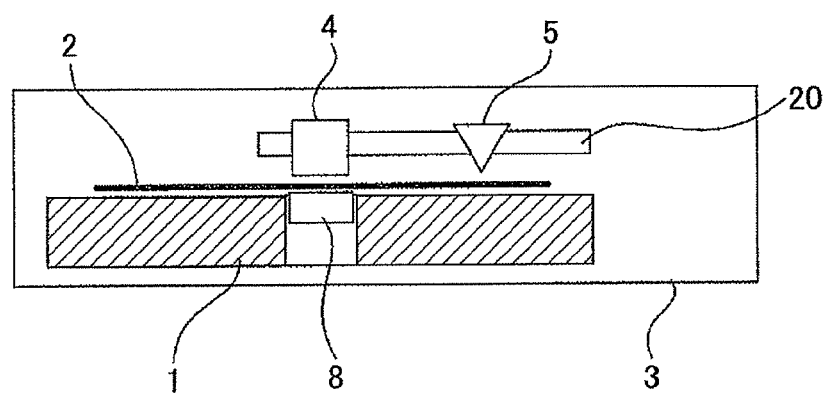

FIGS. 2A and 2B are a perspective view and a side view of the tray-stabilizer combined member 1 according to the embodiment when the thin optical disk 2 is unloaded; FIGS. 2C, 2D, and 2E are respectively a perspective view, a side view, and a transparent side view of the tray-stabilizer combined member 1 when the thin optical disk 2 is loaded.

As illustrated in FIGS. 1A, 1B, and 1C, the disk drive system 3 includes a drive unit (i.e., spindle unit 4) to rotate the flexible thin optical disk 2 and the tray-stabilizer combined member 1 to apply aerodynamic force to the rotating thin optical disk 2. With this configuration, a surface run-out of the thin optical disk 2 is stabilized in the disk drive system 3, so that information is recorded on or reproduced from the thin optical disk 2. The disk drive system 3 further includes a load/unload mechanism to load/unload the thin optical disk 2 inside or outside of the disk drive system 3 in which a drive system such as the tray drive motor 15 drives the tray-stabilizer combined member 1 to move approximately parallel to a disk placing surface of the tray-stabilizer combined member 1 on which the thin optical disk 2 is placed.

FIGS. 2A and 2B illustrate cases where the thin optical disk 2 is unloaded outside of the disk drive system 3 whereas FIGS. 2C and 2D illustrate cases where the thin optical disk 2 is loaded inside of the disk drive system 3.

With this configuration, since a sufficient space may be provided for a side opposite to a surface of the thin optical disk 2 that faces the tray-stabilizer combined member 1 inside the disk drive system 3, a stabilizing effect of the aerodynamic force may be reliably obtained and loading/unloading of the flexible thin optical disk 2 may be easily carried out.

In this embodiment, the spindle unit 4 and an optical pickup 5 are mounted on a same frame (i.e., a base unit 20) to form a unit. Further, the tray-stabilizer combined member 1 and the clamper 8 are also integrated as a unit to be assembled with the base unit 20, thereby forming the disk drive system 3.

Since a positional relationship between the spindle unit 4 and the optical pick up unit 5 needs maintaining with high accuracy, the spindle unit 4 and the optical pick up unit 5 are mounted on the same base unit 20 to easily maintain the highly accurate positional relationship between the spindle unit 4 and the optical pick up unit 5 in this embodiment. Accordingly, the disk drive system 3 is formed by combining the frame (the base unit 20) having the spindle unit 4 and the optical pickup 5 with the tray-stabilizer combined member 1 having the clamper 8 via a not shown position adjusting mechanism as illustrated in FIG. 2E.

Note that the clamper 8 is connected to and supported on the tray-stabilizer combined member 1 with a sufficient space via a later-described elastic member (e.g., piano wire, metallic plate), such that the clamper 8 can still be rotated after the clamper 8 is moved in a direction perpendicular to the tray-stabilizer combined member 1 by a predetermined distance. Accordingly, even if a distance between the turntable 7 (having the clamper 8) and the tray-stabilizer combined member 1 is changed after having clamped the thin optical disk 2 between the clamper 8 and the turntable 7, the thin optical disk 2 may still be rotated without any adverse effects.

When the thin optical disk 2 starts rotating, the surface run-out of the thin optical disk 2 may be suppressed and stabilized by a following sequence of operations. That is, the distance between the turntable 7 and the tray-stabilizer combined member 1 is increased to longer than 1000 μm, the rotational speed of the thin optical disk 2 is then increased up to approximately 4000 rpm, and the distance between the turntable 7 and the tray-stabilizer combined member 1 is subsequently decreased to approximately 300 μm or less. This sequence of operations is mandatory for the thin optical disk (see Jpn. J. Appl. 46 (2007) pp. 3750-3754: High Speed Flexible Optical Disk with Cylindrically Concaved Stabilizer: Yasutomo Aman, Nobuaki Onagi, Shozo Murata, Yasunori Sugimoto, Daiichi Koide, and Haruki Tokumaru: Published Jun. 22, 2007).

As illustrated in FIG. 2E, the spindle unit 4 for rotating the thin optical disk 2 and the optical pickup 5 for recording and reproducing information are arranged above the thin optical disk 2 that faces the tray-stabilizer combined member 1.

This configuration facilitates setting a moving mechanism for the tray-stabilizer combined member 1 and setting the thin optical disk 2 onto the tray-stabilizer combined member 1 when the thin optical disk 2 is loaded inside or unloaded outside of the disk drive system 3.

Figure 3A:
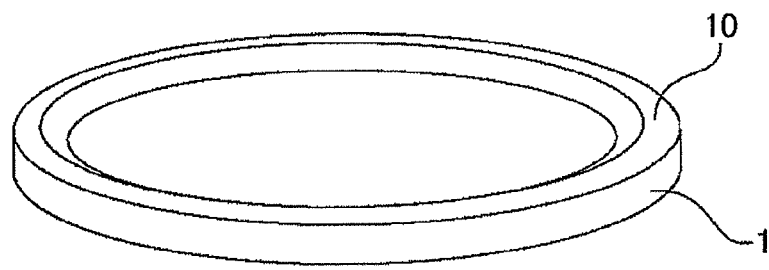
FIG. 3A is a schematic perspective view illustrating a tray-stabilizer combined member arranged in the disk drive system according to the embodiment.
Figure 3B:
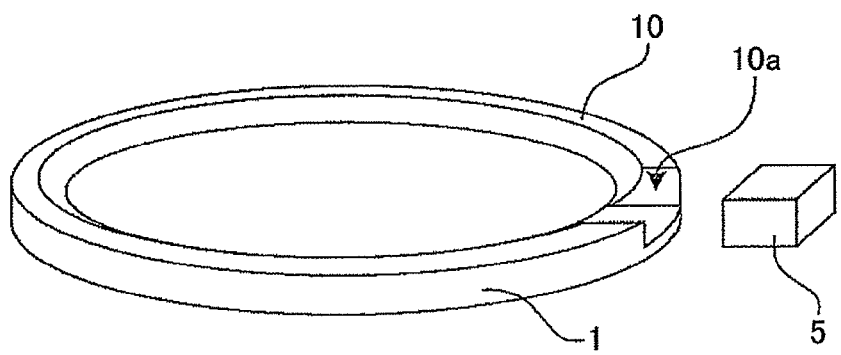
FIG. 3B is a schematic perspective view illustrating the tray-stabilizer combined member arranged in the disk drive system according to the embodiment in which a guiding recess portion for guiding an optical pick up unit is provided.
Figure 3C:
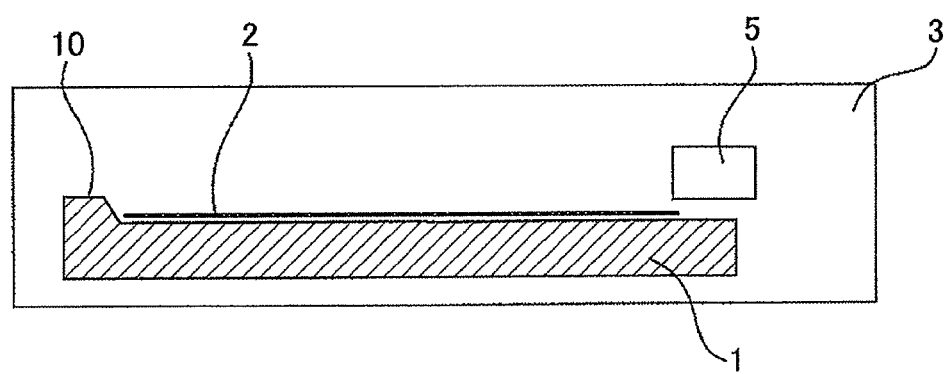
FIG. 3C is a schematic sectional view of the tray-stabilizer combined member arranged in the disk drive system according to the embodiment.

FIG. 3A is a schematic perspective view illustrating the tray-stabilizer combined member 1 according to the embodiment, FIG. 3B is a schematic perspective view illustrating the tray-stabilizer combined member 1 in which a guiding recess portion 10a for guiding the optical pick up unit 5, and FIG. 3C is a schematic sectional view of the tray-stabilizer combined member 1.

As illustrated in FIG. 3A, a bank-shaped disk guide 10 is provided around the periphery of the disk placing surface of the tray-stabilizer combined member 1 in the disk drive system 3. The disk guide 10 is provided for preventing the thin optical disk 2 from falling off from the tray-stabilizer combined member 1 when the thin optical disk 1 is loaded inside or unloaded outside of the disk drive system 3.

Further, as illustrated in FIGS. 3B and 3C, the guiding recess portion 10a is provided in a part of the disk guide 10. The guiding recess portion 10a is provided in the part of the disk guide 10 such that the optical pickup 5 can move over the thin optical disk 2 without restriction and to record on or reproduce information from the thin optical disk 2.

Figure 4B:
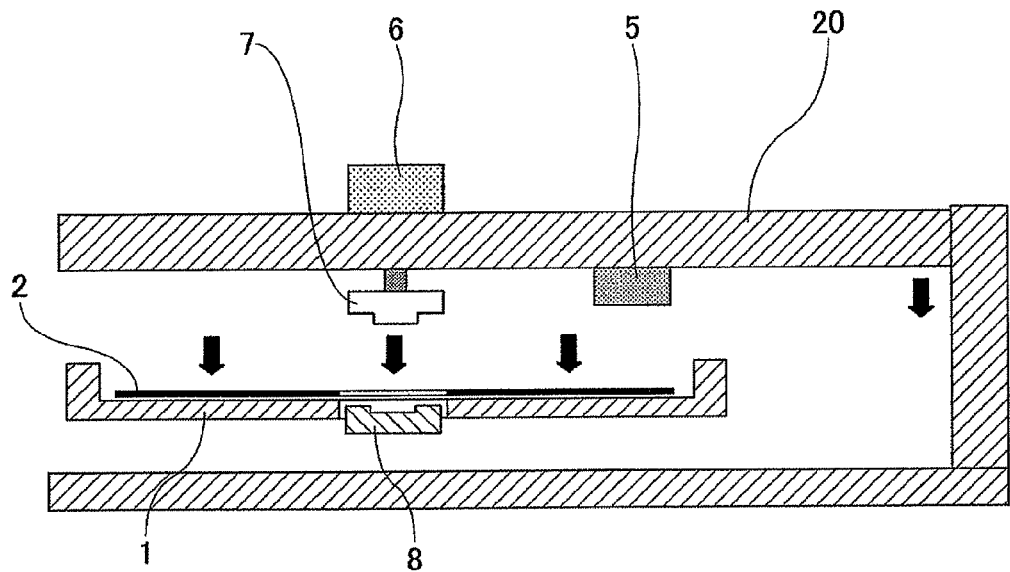
Figure 4C:
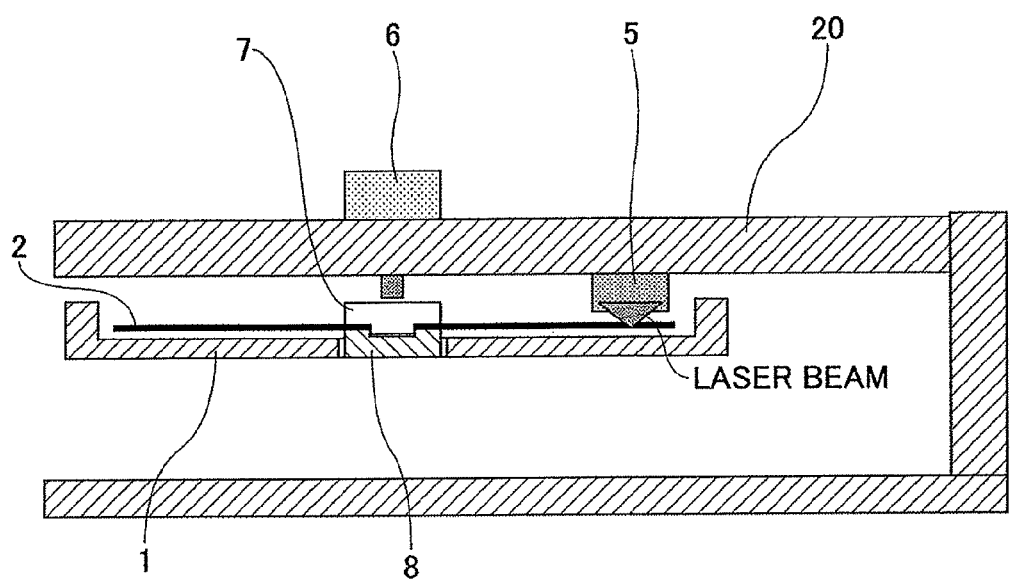

FIGS. 4A, 4B, and 4C are sectional views illustrating a sequence of operations of a clamping mechanism in the disk drive system 3 according to the embodiment.

As illustrated in FIG. 4A, the thin optical disk 2 is placed on the tray-stabilizer combined member 1 that includes the clamper 8. The tray-stabilizer combined member 1 on which the thin optical disk 2 is placed is moved inside the disk drive system 3. When the tray-stabilizer combined member 1 on which the thin optical disk 2 is placed is stopped at a predetermined position inside the disk drive system 3, the base unit 20 to which the spindle motor 6 and the optical pickup 5 are attached is lowered by a not shown base unit moving mechanism in a downward direction indicated by solid arrows as illustrated in FIG. 4B.

When the base unit 20 is lowered to a certain position, the clamper 8 is attracted to the turntable 7 by the magnetic fields generated between the turntable 7 and the clamper 8. That is, in order to clamp the thin optical disk 2 between disk clamping portions 31 (see FIG. 5) one provided in each of the turntable 7 and the clamper 8, a magnetic member such as a permanent magnet 34 is provided in one or both of the turntable 7 and the clamper 8 as illustrated in FIG. 5.

As a result, the clamper 8 raises the thin optical disk 2 in an upward direction and the turntable 7 is lowered to a predetermined position such that the thin optical disk 2 is clamped between the clamper 8 and the turntable 7 via a center hole 21 of the thin optical disk 2. Referring back to FIG. 4C, the thin optical disk 3 stably clamped between the clamper 8 and the turntable 7 is rotated by the spindle motor 6, and the optical pickup 5 records desired data on or retrieves the data from the thin optical disk 2 while the stably clamped thin optical disk 3 is rotated.

Figure 6A:
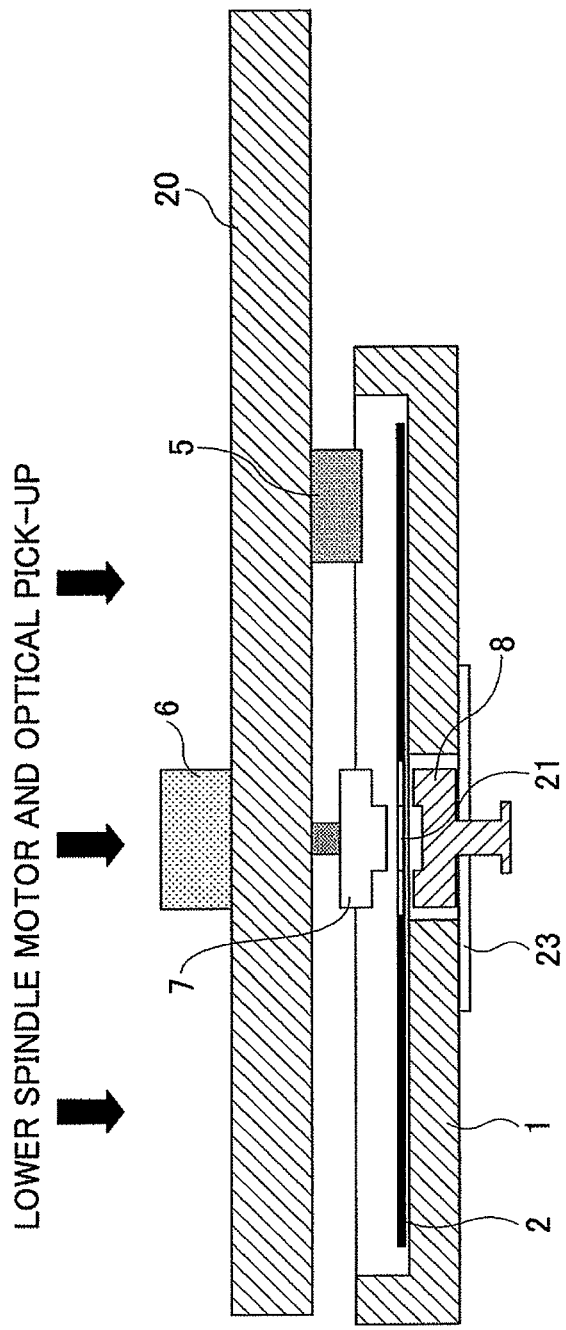
FIGS. 6A, 6B, and 6C are enlarged sectional views illustrating processes where a thin optical disk is clamped with the clamper and a turntable arranged in the disk drive system according to the embodiment.
Figure 6B:
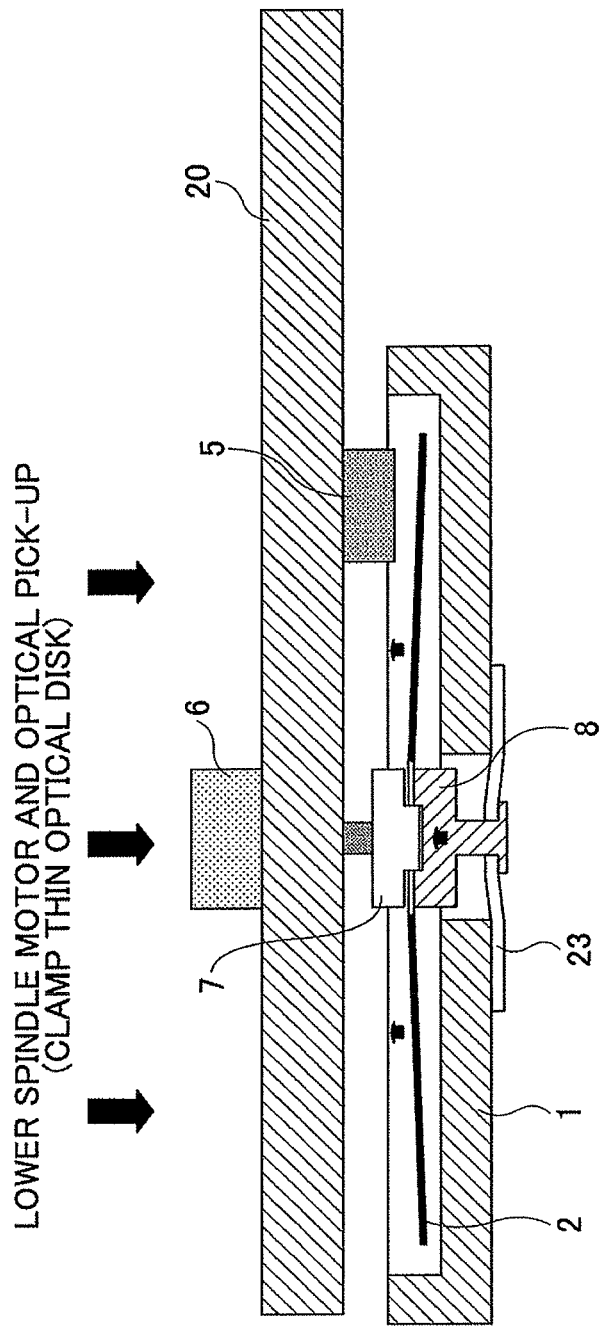
Figure 6C:
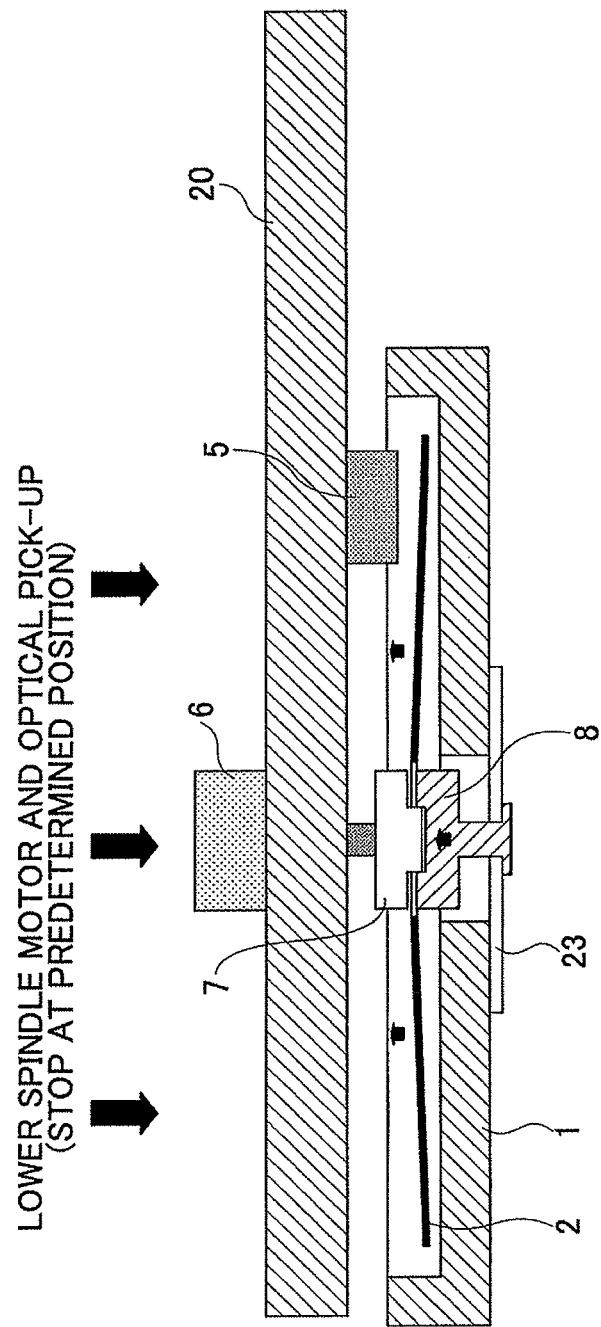

FIGS. 6A through 6C are enlarged views illustrating processes where the thin optical disk 2 is clamped by the sequence of operations of the clamping mechanism in the disk drive system 3 illustrated in FIGS. 4B and 4C. Specifically, the base unit 20 is lowered from the position illustrated in FIG. 6A to a predetermined position. When the base unit 20 approaches the tray-stabilizer combined member 1, magnetic fields are generated between the turntable 7 and the clamper 8 to attract the clamper 8 to the turntable 7. Accordingly, the clamper 8 fractionally raises the thin optical disk 2 in an upward direction to be engaged with the lowered turntable 7, thereby clamping the thin optical disk 2 between the clamper 8 and the turntable 7. Note that since the clamper supporting member 23 is formed of an elastic member, the clamper supporting member 23 is deformed as illustrated in FIG. 6B, which facilitates the clamping of the thin optical disk 2 by the attraction of the magnetic fields.

Figure 5:
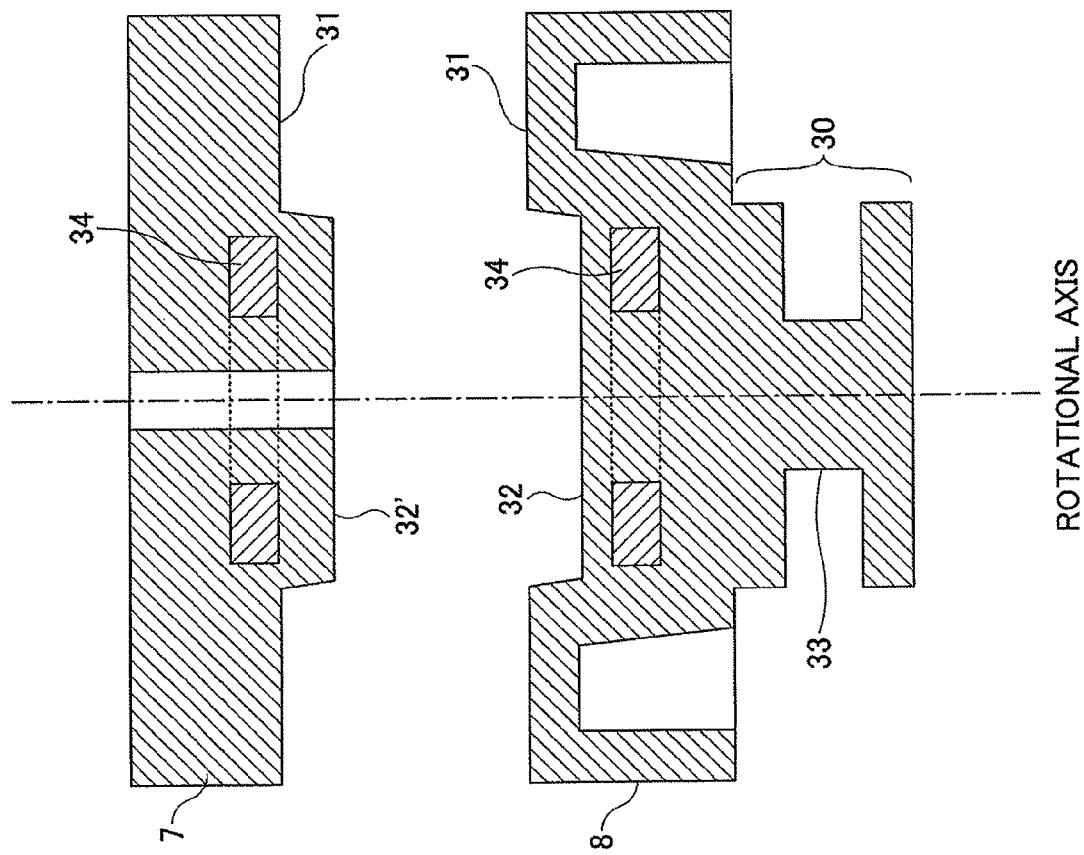
FIG. 5 is a schematic sectional view illustrating a configuration of a clamper in relation to a turntable arranged in the disk drive system according to the embodiment.

Further, the thin optical disk 2 is clamped between the turntable 7 and the clamper 8 by engaging an engaging projection portion 32' of the turntable 7 with an engaging recess portion 32 of the clamper 8 via a center hole of the thin optical disk 2 as illustrated in FIG. 5. Note that the thin optical disk 2 is securely clamped if the turntable 7 is rotated at low speeds.

Subsequently, as illustrated in FIG. 6C, the base unit 20 is designed to stop at a predetermined position when lowering the base unit 20 having the spindle motor 6 and the optical pickup 5. That is, the base unit 20 is designed to stop at the predetermined position such that the distance between the tray-stabilizer combined member 1 and the lower surface of the thin optical disk 2 (i.e., the surface that faces the tray-stabilizer combined member 1) has a sufficient space so as not to allow the thin optical disk 2 to contact the tray-stabilizer combined member 1 when the rotation of the thin optical disk 2 is stopped, and a period between when the rotation of the thin optical disk 2 is started and when the rotation of the thin optical disk 2 is stabilized.

Figure 7A:
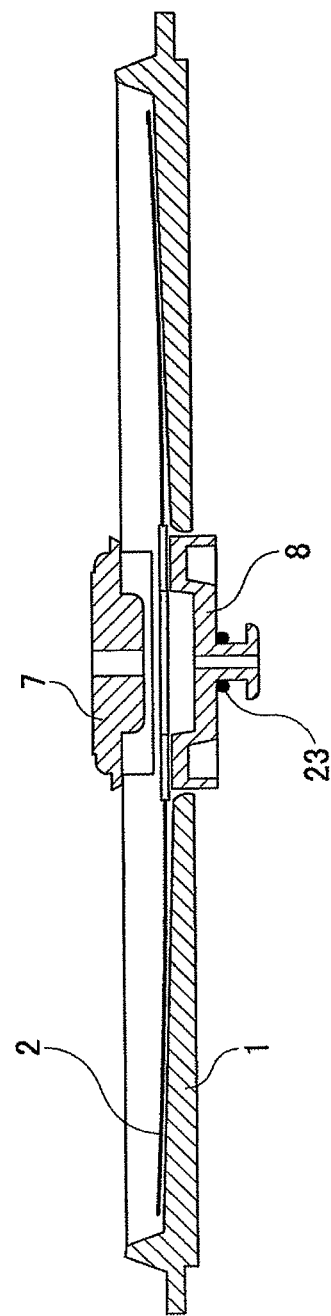
FIG. 7A is a sectional view illustrating the tray-stabilizer combined member of the clamping mechanism according to the embodiment.
Figure 7B:
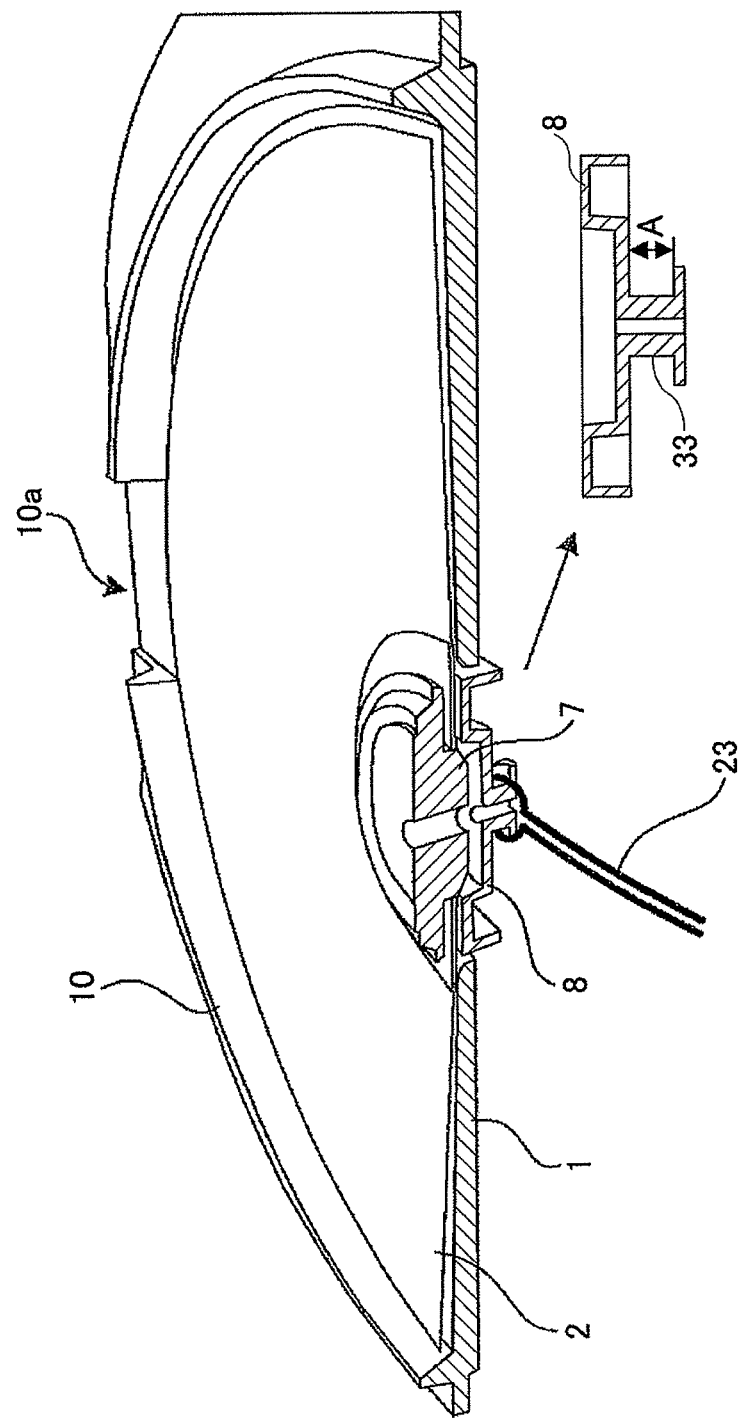
FIG. 7B is a perspective view illustrating a half of the tray-stabilizer combined member of the clamping mechanism.

FIGS. 7A, 7B, 7C, and 7D are sectional views illustrating examples of the clamping mechanism in the disk drive system 3 according to the embodiment. Note that FIG. 7A corresponds to FIG. 6A, and is a sectional view illustrating the thin optical disk 2 placed on the tray-stabilizer combined member 1 loaded inside the disk drive system 3, whereas FIG. 7B is a perspective view illustrating half of the thin optical disk 2 placed on the tray-stabilizer combined member 1 loaded inside the disk drive system 3. Note that in FIG. 7B, an outer periphery of the thin optical disk 2 placed on the tray-stabilizer combined member 1 is slightly curved in an upward direction because the thin optical disk is thin.

The clamping mechanism is arranged at the center of the tray-stabilizer combined member 1. The tray-stabilizer combined member 1 includes the clamper supporting member 23 formed of the elastic member (e.g., piano wire) that is supported in a suspended manner with a sufficient space such that the clamper supporting member 23 does not interrupt vertical movements of the clamper 8 provided on the tray-stabilizer combined member 1 when the clamper 8 is attracted to the not shown spindle unit 4 of the turntable 7, or the clamper supporting member 23 does not interrupt the rotation of the thin optical disk 2 while the thin optical disk 2 is rotated.

When the thin optical disk 2 is loaded, the turntable 7 is lowered to clamp the thin optical disk 2 to the clamper 8. In this process, the range of movements of the clamper 8 is determined based on the elasticity of the clamper supporting member 23 and the allowance for supporting the clamper 8. Further, the clamper supporting member 23 is also designed to detach from the clamper 8 at the threshold of the determined range of the movements of the clamper supporting member 23 when the turntable 7 is raised beyond the threshold of the determined range in order to unload the thin optical disk 2.

Figure 7C:
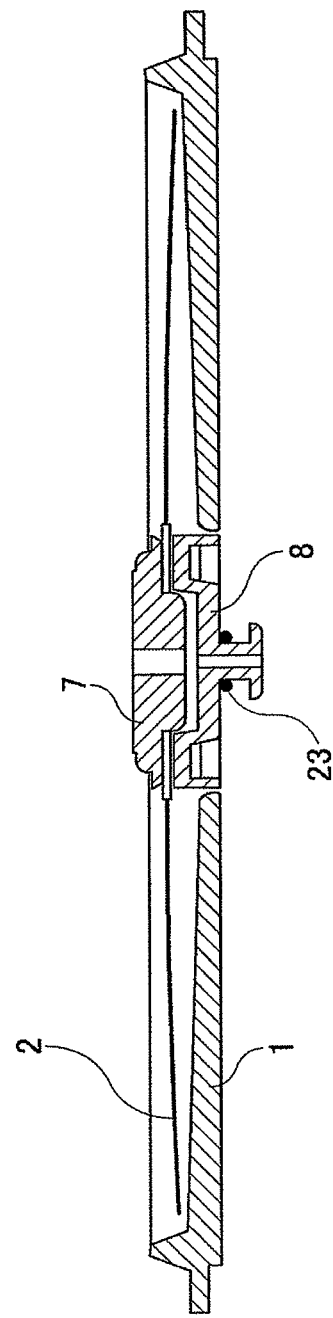
FIG. 7C is a sectional view of the tray-stabilizer combined member of the clamping mechanism when the thin optical disk is claimed.

FIG. 7C corresponds to FIG. 6B and FIG. 6C, and is a sectional view illustrating the thin optical disk 2 clamped between the clamper 8 and the turntable 7. As described earlier, the turntable 7 is lowered to clamp the thin optical disk 2; however, the turntable 7 is configured to be lowered such that there is a sufficient distance (space) of about 1000 to 3000 μm between the tray-stabilizer combined member 1 and the clamped thin optical disk 2 in order to prevent the clamped thin optical disk 2 from contacting the tray-stabilizer combined member 1.

Accordingly, the thin optical disk 2 does not contact the tray-stabilizer combined member 1 while rotating, and there is no surface run-out of the thin optical disk 2 while rotating because of the effect of the aerodynamic force applied to the rotating thin optical disk 2. As a result, the thin optical disk 2 may be stably rotated while maintaining the distance of 1000 to 3000 μm between the thin optical disk 2 and the tray-stabilizer combined member 1. Since there is no surface run-out of the thin optical disk 2, the thin optical disk 2 having a thin and light-weight configuration may be rotated at higher speeds.

Any portion of the clamper 8 of FIG. 5 sectioned in any horizontal direction has a round configuration. Note that as illustrated in FIG. 5, a shaft portion 30 is provided at a lower part of the clamper to match a center of the clamper and a clamper supporting recess portion 33 is provided in the shaft portion 30 for supporting the clamper 8 via the clamper supporting member 23 (i.e., piano wire). When the spindle of the turntable 7 is not lowered, the clamper supporting member 23 (i.e., piano wire) supports the clamper 8 at an upper end of the clamper supporting recess portion 33 provided in the shaft portion 30 of the clamper 8 (see FIG. 6A and FIG. 7A). However, when the turntable 7 is lowered and the attraction is thus generated between the turntable 7 and the clamper 8 by magnetic fields, the clamper 8 is raised without detaching from the upper end of the clamper supporting recess portion 33 and without detaching from a round portion (see the later-described "round attachment portion 35" in FIG. 8A) of the clamper supporting member 23 (piano wire). When the thin optical disk 2 is eventually clamped between the turntable 7 and the clamper 8, the clamper supporting member 23 (piano wire) is located at a lower end of the clamper supporting recess portion 33 of the shaft portion 30 of the clamper 8 (see FIG. 6C and FIG. 7C).

Note the clamping mechanism in the disk drive system 3 has the following clamp configuration. That is, a length A of the clamper supporting recess portion 33 (see FIG. 7B) in a direction perpendicular to the thin optical disk surface is determined such that the clamper supporting recess portion 33 will not interfere with the thin optical disk 2 in its thickness direction or the clamping (timing) of the thin optical disk 2 on the spindle unit 4 while rotating the thin optical disk 2. Accordingly, the clamper 8 integrated with the thin optical disk 2 is capable of stably rotating at high speeds without contacting the clamper supporting member 23 (piano wire) to interrupt the rotation of the thin optical disk 2.

Figure 7D:
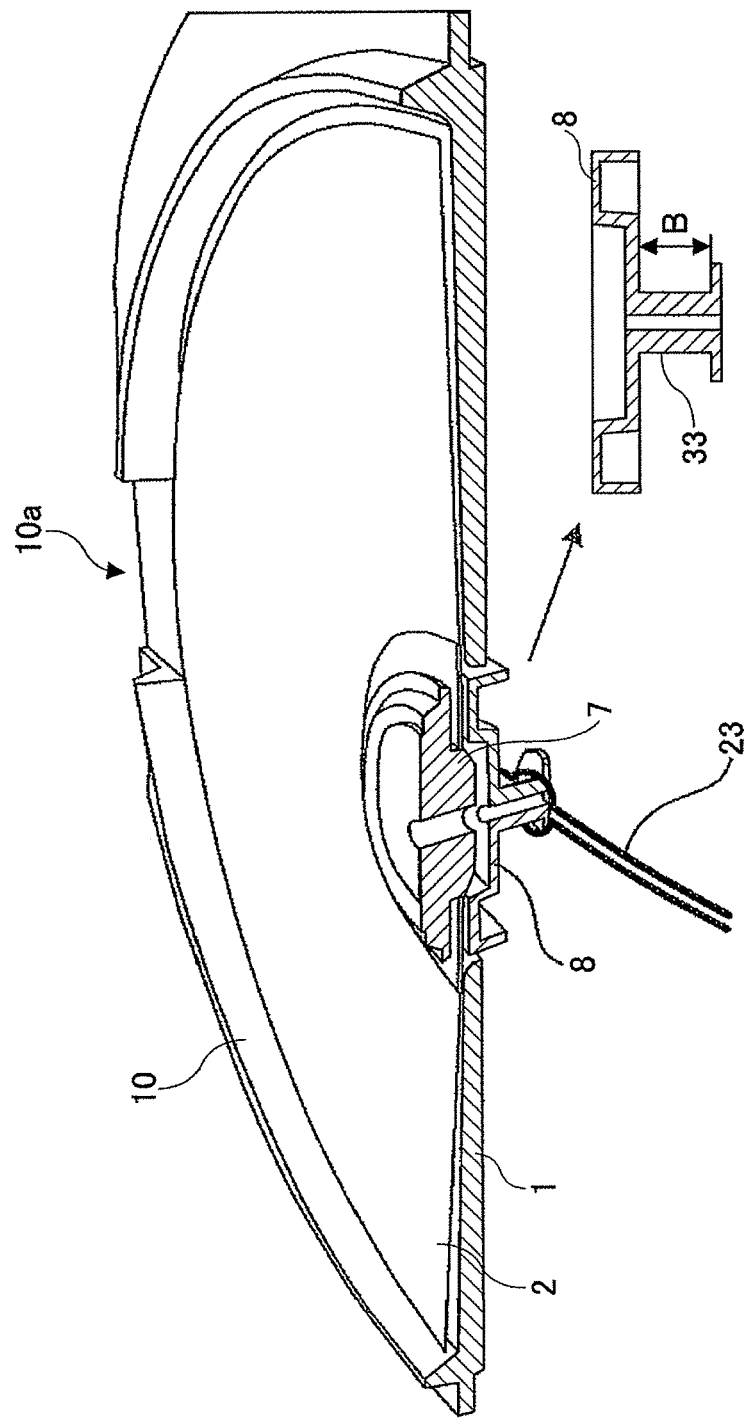
FIG. 7D is a perspective view illustrating a half of the tray-stabilizer combined member of the clamping mechanism using a different clamper.

Note that if the length A (see FIG. 7B) of the clamper supporting recess portion 33 in the direction perpendicular to the thin optical disk surface is changed into a length B of about 4 to 6 mm as illustrated in FIG. 7D, abnormal oscillations may be generated when the thin optical disk 2 is rotated at a high rotational speed of about 10000 rpm. Thus, it is preferable that the length A (see FIG. 7B) of the clamper supporting recess portion 33 in the direction perpendicular to the thin optical disk surface be set, for example, at about 1 mm to 3 mm (i.e., 1000 to 3000 μm) for stably rotating the thin optical disk 2 with suppressing the generation of abnormal oscillation. Further, since there may be fewer projections required in the disk drive system 3, the disk drive system 3 may be made with a thinner configuration.

Figure 8A:
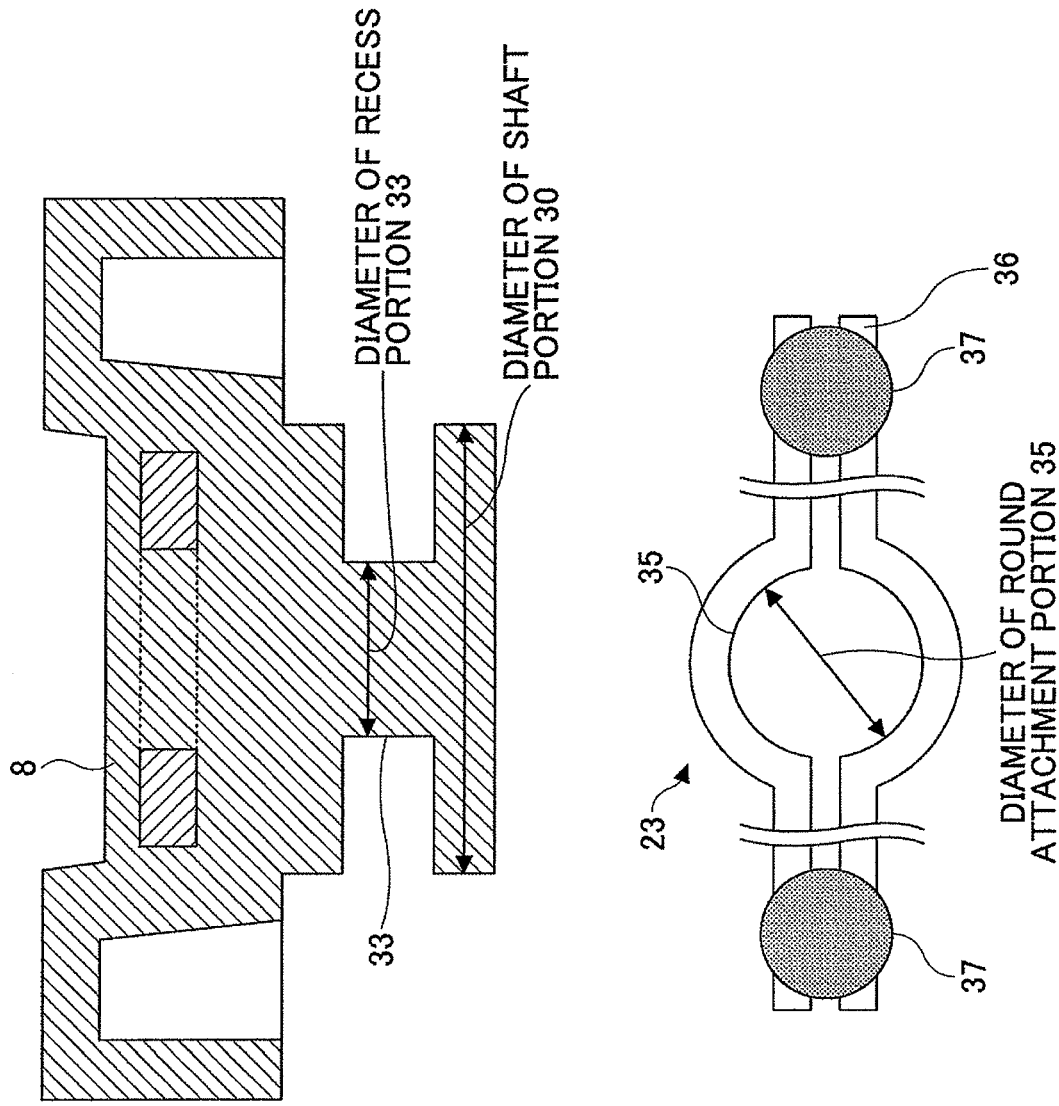
FIGS. 8A and 8B are schematic configuration views respectively illustrating a clamper supporting member to which a piano wire is provided and a clamper supporting member to which a metal plate is provided.
Figure 8B:
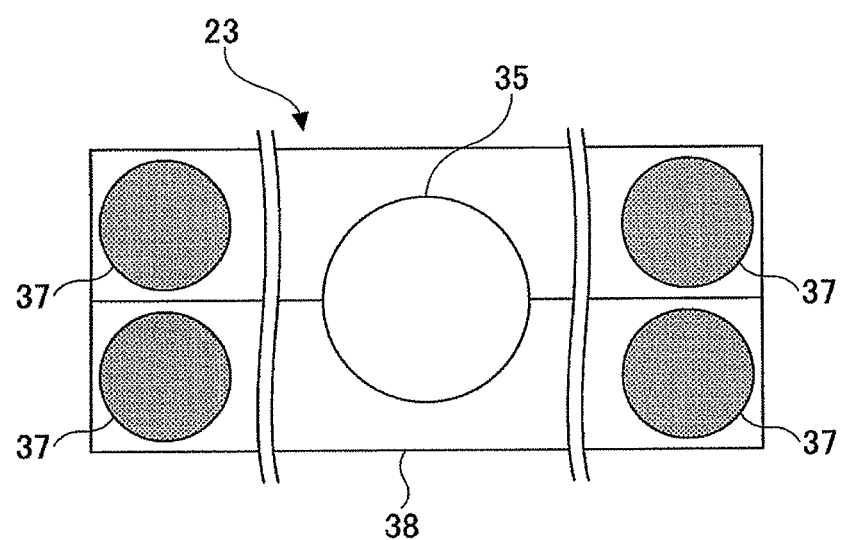

FIGS. 8A and 8B are schematic views illustrating examples of a configuration of the clamper supporting member 23. As illustrated in FIG. 8A, the clamper supporting member 23 is formed of the piano wire 36 and loosely supports the clamper 8 at the center of the tray-stabilizer combined member 1. Since the clamper supporting member 23 is formed of the piano wire 36, the disk drive system 3 may be made thinner and light-weighted, and thus is made at low cost.

The round attachment portion 35 of the clamper supporting member 23 loosely engaging the clamper supporting recess portion 33 is configured to have a diameter slightly larger than the diameter of the clamper supporting recess portion 33 including an amount of a maximum allowable drift of a rotational shaft of the clamper 8 obtained while rotating the thin optical disk 2. The clamper supporting member 23 includes the round attachment portion 35 at the central portion of the clamper supporting member 23 and having a diameter smaller than a diameter of a shaft portion 30 of the clamper 8 such that the round attachment portion 35 will not be detached from the clamper supporting recess portion 33. Further, in order to fix the clamper supporting member 23 made of the piano wire 36 to the tray-stabilizer combined member 1, fixing portions of the clamper supporting member 23 located at both its ends (two ends) are fixed to the tray-stabilizer combined member 1 with screws 37 or with not-shown adhesive.

FIG. 8B is a view illustrating an example of the clamper supporting member 23 that is made of made of metallic plates 38. As illustrated in FIG. 8B, the clamper supporting member 23 made of the metallic plates 38 includes a round hole at its central portion that is used as the round attachment portion 35 for supporting the clamper 8. Accordingly, the clamper supporting member 23 maybe made of materials other than the piano wire 36 such as the metallic plates 38 as illustrated in FIG. 8B.

Note that an experiment was conducted on the embodiment of the invention with the following procedure. A specimen of the clamping mechanism according to the embodiment and a thin-film optical disk having a thickness of 0.1 mm were prepared, and a sequence of the clamping operations was repeatedly conducted 1000 times. In this experiment, the thin-film optical disk was placed on the tray-stabilizer combined member 1 and a sequence of operations including loading, clamping, and unloading of the thin-film optical disk was then repeated 1000 times. The stable clamping operations in the disk drive system 3 having the above configuration were thus evaluated.

FIGS. 9A, 9B, 9C, and 9D are views illustrating examples of positional relationships between the thin optical disk 2 and the tray-stabilizer combined member 1 in the sequence of clamping operations in a period between when the disk rotation is stopped and when the disk rotation is stabilized. Note that the disk drive system 3 (not shown in FIGS. 9A to 9D) integrally includes the tray-stabilizer combined member 1, the turntable 7 that is movable in vertical directions, the spindle motor 6, and the optical pickup 5. The turntable 7 (including the spindle motor 6) is relatively moved in upward or downward directions by a relative position adjusting mechanism based on the movements of the base unit moving mechanism (not shown).

In the disk drive system 3, the thin optical disk 2 is loaded from outside of the disk drive system 3 and is subsequently clamped between the turntable 7 and the clamper 8 (see FIGS. 4A to 4C). Thereafter, the turntable 7 is moved about 100 μm in upward and downward directions by first and second drive units 25 and 26 (see FIGS. 11A and 11B). Since the clamper 8 in this process has a sufficient vertical movement allowance given by the clamper supporting member 23, the clamper 8 that has clamped the thin optical disk 2 to the turntable 7 may be moved in upward and downward directions. Accordingly, the distance between the thin optical disk 2 and the tray-stabilizer combined member 1 may be changed.

Figure 9A:
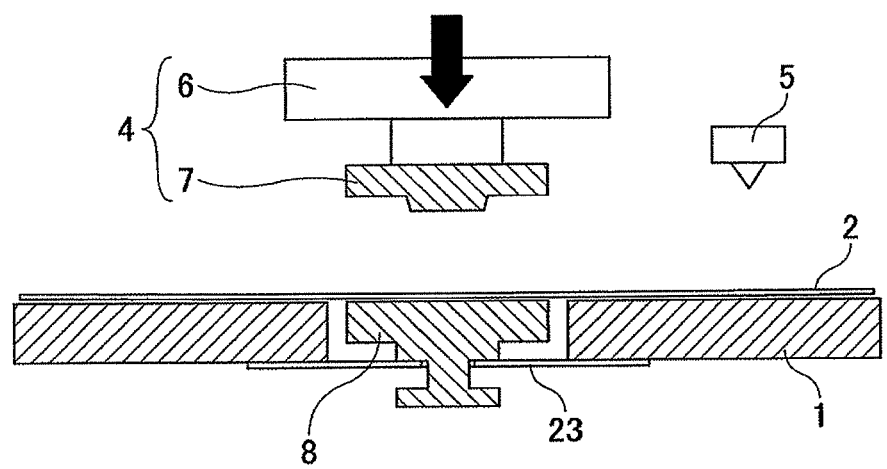
FIGS. 9A, 9B, 9C, and 9D are views illustrating positional relationships between the thin optical disk and the tray-stabilizer combined member in a sequence of operations in a period between when a disk rotation is stopped and when the disk rotation is stabilized.
Figure 9B:
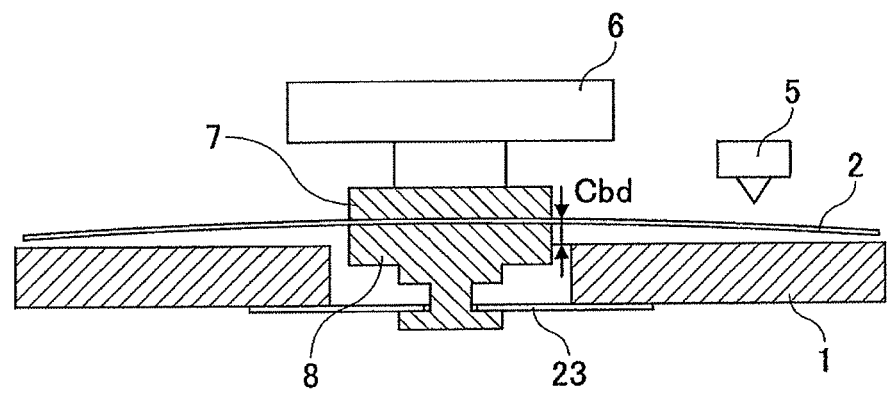
Figure 9C:
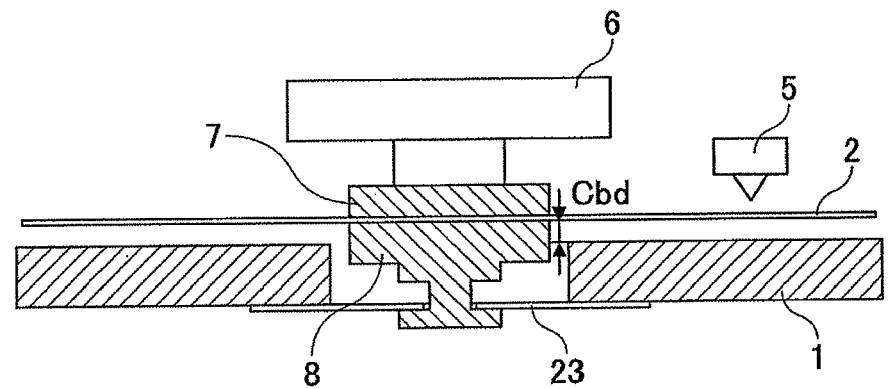
Figure 9D:
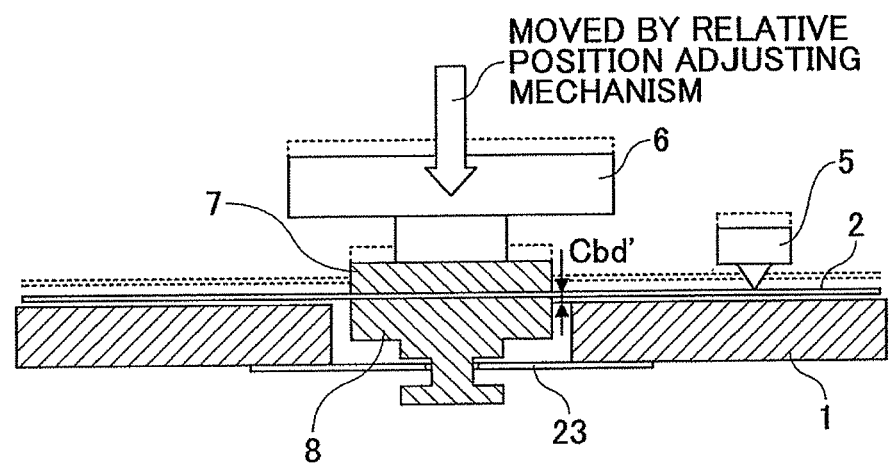

When the turntable 7 is lowered closer to the thin optical disk 2 placed on the tray-stabilizer combined member 1 as illustrated in FIG. 9A, the thin optical disk 2 is clamped between the turntable 7 and the clamper 8 as illustrated in FIG. 9B. Thereafter, when the rotation of the thin optical disk 2 is started, the thin optical disk 2 has a distance Cbd (Cbd=1000 to 3000 μm) from the tray-stabilizer combined member 1 as illustrated in FIG. 9C, and is continuously rotated at a constant rotational speed. Further, the thin optical disk 2 is moved toward the tray-stabilizer combined member 1 such that the distance (i.e., Cbd in FIG. 9C) between the thin optical disk 2 and the tray-stabilizer combined member 1 is changed to a distance Cbd' that is approximately shorter than 3000 μm as illustrated in FIG. 9D. Accordingly, a stable run-out characteristic may be obtained and accurate recording or reproducing performance may thus be achieved. In this case, the distance between the thin optical disk 2 and the tray-stabilizer combined member 1 is approximately from 80 to 300 μm.

When the thin optical disk 2 is clamped between the turntable 7 and the clamper 8 and the rotation of the thin optical disk 2 is stopped, the thin optical disk 2 is downwardly curved from an inner periphery to an outer periphery of the thin optical disk 2 in a direction of gravitational force as illustrated in FIG. 9B. As illustrated in FIG. 9C, when the rotation of the thin optical disk 2 is started, the downwardly curved thin optical disk 2 is gradually restored by centrifugal force of the rotation and then is fully restored without curved portions by centrifugal force of the rotation. In this state, the rotation of the thin optical disk 2 is stabilized such that the thin optical disk 2 does not contact the tray-stabilizer combined member 1 even if the thin optical disk 2 is moved closer to the tray-stabilizer combined member 1. Since the thin optical disk 2 is further moved closer to the tray-stabilizer combined member 1 (indicated by a downward thick arrow in FIG. 9D) by a relative position adjusting mechanism, an effect of suppressing the amount of the surface run-out of the thin optical disk 2 may be obtained by the effect of aerodynamic force applied to the rotating thin optical disk 2.

Accordingly, even when the tray-stabilizer combined member 1 is located beneath the thin optical disk 2, the thin optical disk 2 may also be prevented from contacting, becoming attached to or making sliding contact with the tray-stabilizer combined member 1 due to electrostatic force.

FIGS. 10A, 10B, 10C, and 10D are views illustrating other examples of the positional relationships between the thin optical disk 2 and the tray-stabilizer combined member 1 in the sequence of clamping operations in the period between when the disk rotation is stopped and when the disk rotation is stabilized. Note that although not explicitly described, the disk drive system 3 (not shown in FIGS. 10A to 10D) integrally includes the tray-stabilizer combined member 1 that is moved by a not shown relative position adjusting mechanism in vertical directions (upward and downward directions), the turntable 7 that is moved by a not shown base unit moving mechanism in vertical directions, the spindle motor 6, and the optical pickup 5. The configurations of the clamping mechanism illustrated in FIGS. 10A to 10D differ from those illustrated in FIGS. 9A to 9D in that the relative position adjusting mechanism that raises or lowers the tray-stabilizer combined member 1 needs a separate drive mechanism.

Figure 10A:
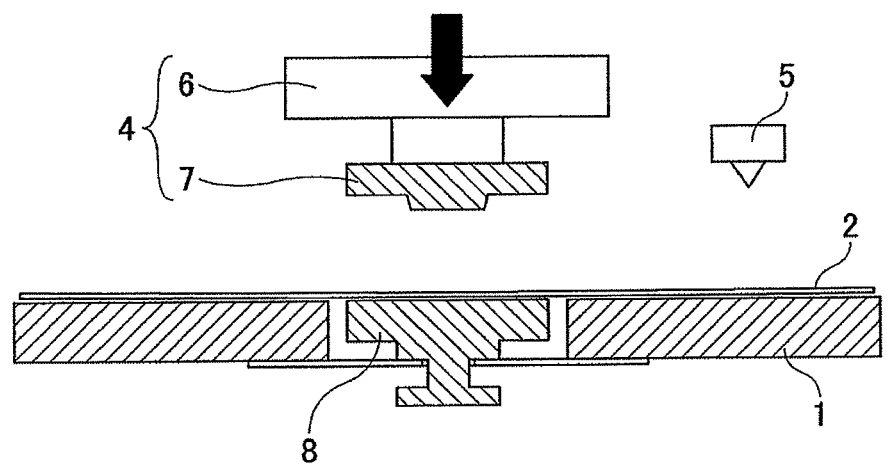
FIGS. 10A, 10B, 10C, and 10D are views illustrating other positional relationships between the thin optical disk and the tray-stabilizer combined member in the sequence of operations in a period between when the thin optical disk rotation is stopped and when the thin optical disk rotation is stabilized.
Figure 10B:
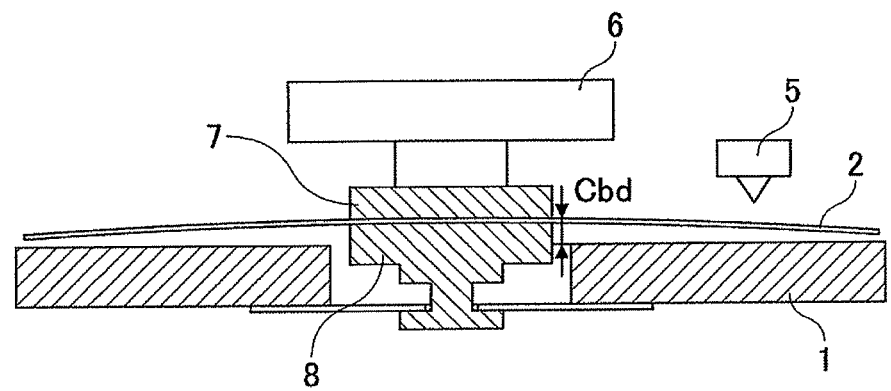
Figure 10C:
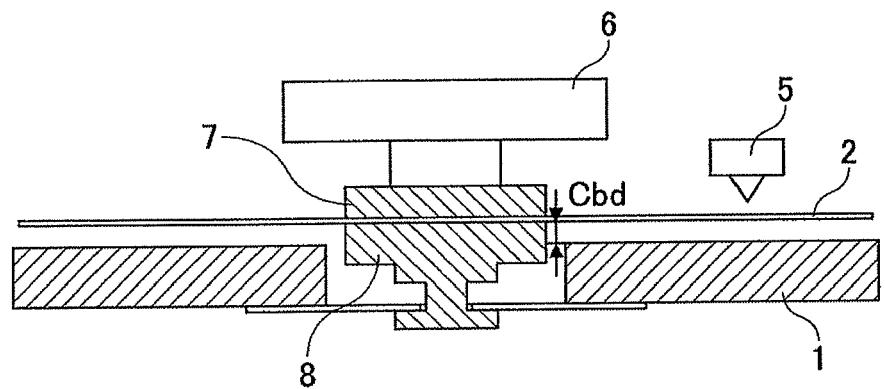
Figure 10D:
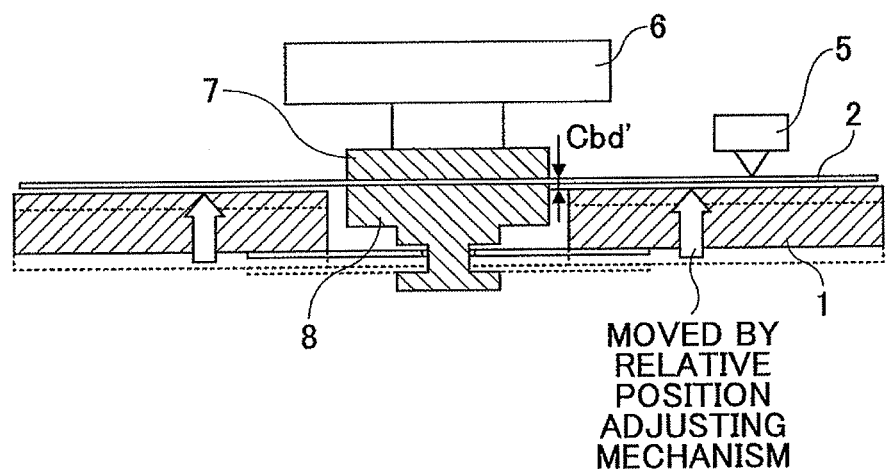

Similar to the case illustrated in FIG. 9B, when the thin optical disk 2 is clamped between the turntable 7 and the clamper 8 and the rotation of the thin optical disk 2 is stopped, the thin optical disk 2 is downwardly curved from an inner periphery to an outer periphery of the thin optical disk 2 in a direction of gravitational force as illustrated in FIG. 10B. As illustrated in FIG. 10C, when the rotation of the thin optical disk 2 is started, the downwardly curved thin optical disk 2 is gradually restored by centrifugal force of the rotation and is then fully restored without curved portions by centrifugal force of the rotation. In this state, the rotation of the thin optical disk 2 is stabilized such that the thin optical disk 2 does not contact the tray-stabilizer combined member 1 even if the thin optical disk 2 is moved closer to the tray-stabilizer combined member 1. Since the thin optical disk 2 is further moved closer to the tray-stabilizer combined member 1 (indicated by upward thick arrows in FIG. 10D) by a relative position adjusting mechanism, an effect of suppressing the amount of the surface run-out of the rotating thin optical disk 2 may be obtained by the effect of aerodynamic force applied to the rotating thin optical disk 2.

Accordingly, even when the tray-stabilizer combined member 1 is located beneath the thin optical disk 2 similar to the case of FIGS. 9A to 9D, the thin optical disk 2 may also be prevented from contacting, becoming attached to or making sliding contact with the tray-stabilizer combined member 1 due to electrostatic force.

As illustrated in FIGS. 11A and 11B, the disk drive system 3 further includes first and second drive units 25 and 26 configured to raise or lower the base unit 20, and units to control the first and second drive units 25 and 26 in addition to the tray-stabilizer combined member 1 having a clamper 8 and the clamper supporting member 23, and the base unit 20 having the optical pickup 5, the spindle motor 6, and the turntable 7. Note that the units to control the first and second drive units 25 and 26 include first and second raising units, a rotational control unit, a control unit, a laser beam reading unit, and a recording-reproducing unit as illustrated in FIGS. 11A and 11B. With this configuration, a left side and a right side of the base unit 20 (i.e., frame) of the disk drive system 3 may separately be raised by the corresponding first and second drive units 25 and 26.

FIG. 11A illustrates a state where the base unit 20 is lowered in a direction toward the tray-stabilizer combined member 1 to allow the thin optical disk 2 to closely approach the tray-stabilizer combined member 1, be rotated, and carry out a recording operation or a reproducing operation. FIG. 11 B illustrates a state where the base unit 20 is raised in a direction away from the tray-stabilizer combined member 1 to detach the turntable 7 from the clamper 8 and thus detach (disconnect) the thin optical disk 2 from the tray-stabilizer combined member 1, thereby allowing the rotation of the thin optical disk 2 to stop, with the thin optical disk 2 being placed (left) on the tray-stabilizer combined member 1.

Figure 12:
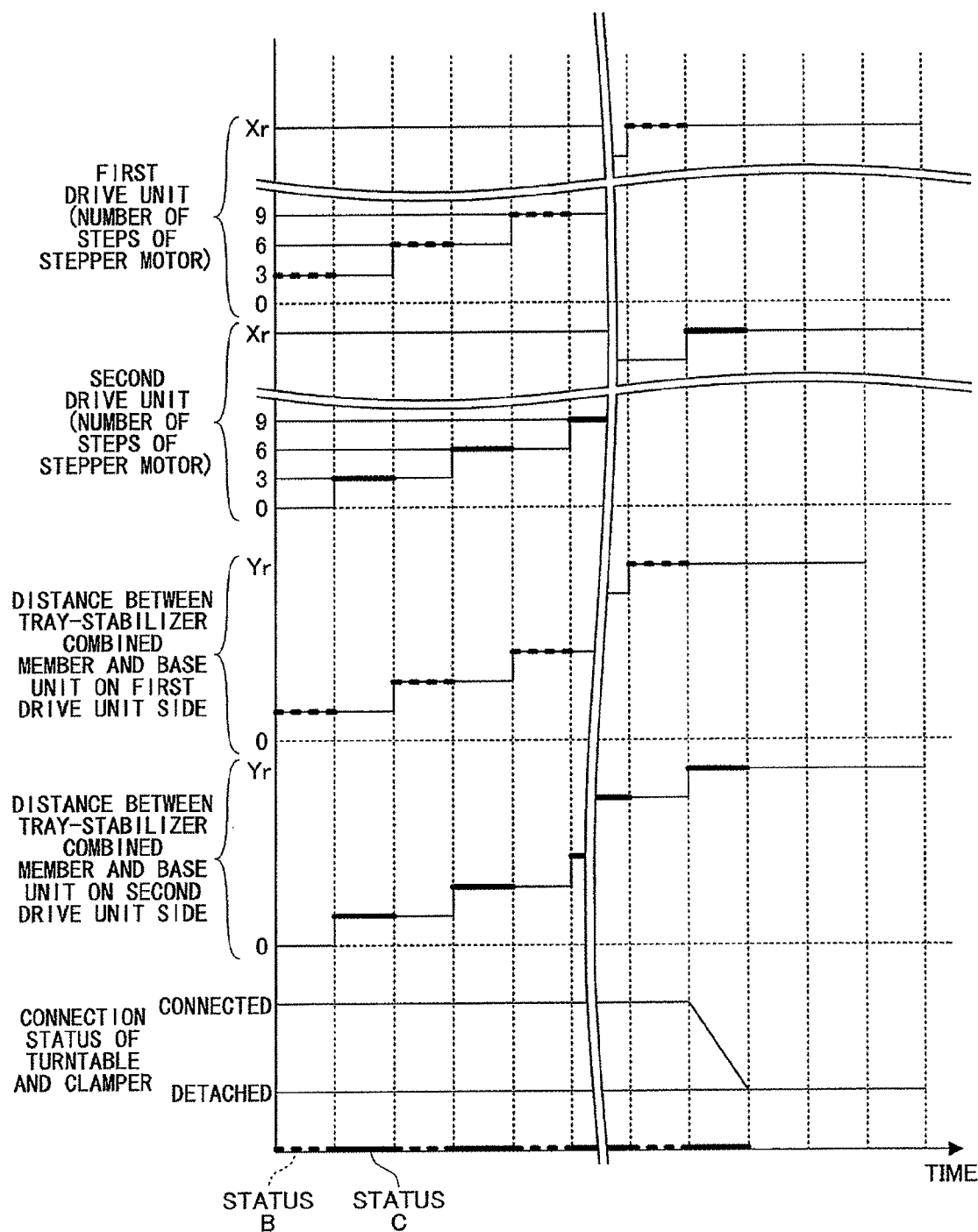
FIG. 12 is a time chart illustrating a relationship between the operations of the first and second drive units illustrated in FIGS. 11A and 11B and loading/unloading of the thin optical disk.

FIG. 12 is a time chart illustrating relationships between operations of the first and second drive units 25 and 26 while the base unit 20 moves away from the tray-stabilizer combined member 1 when the rotation is stopped and a detachment status of the thin optical disk 2.

As illustrated in FIG. 12, when the first drive unit 25 (i.e., a stepper motor) advances three steps, a gear 25a is rotated to slightly lift a left side of the base unit 20 (see FIG. 11B), thereby slightly moving the left side of the base unit 20 away from the tray-stabilizer combined member 1 in an upward direction (see a status B in FIG. 12). Subsequently, when the second drive unit 26 (i.e., a stepper motor) advances three steps, a gear 26a is rotated to slightly lift a right side of the base unit 20 (see FIG. 11B), thereby slightly moving the right side of the base unit 20 away from the tray-stabilizer combined member 1 in an upward direction (see a status C in FIG. 12).

Such advancements of the first drive unit 25 and the second drive unit 26 are alternately repeated so that the left side and the right side of the base unit 20 are lifted in stepwise fashion and the magnetically connected (attracted) turntable 7 and the clamper 8 are detached from each other at a certain point (distance). Further, the thin optical disk 2 detached from the turntable 7 is then dropped onto the tray-stabilizer combined member 1.

Accordingly, it may be possible to easily detach the thin optical disk 2 from the turntable 7 without having a situation where the thin optical disk 2 is difficult to detach from the turntable 7 due to the strong magnetic connection (attraction) generated between the turntable 7 and the clamper 8 or due to the light-weight thin optical disk 2 when the left side and the right side of the base unit 20 are simultaneously lifted.

Note that when the turntable 7 and the clamper 8 are detached by the first and second drive units 25 and 26, the clamper 8 is attracted by the magnetic field generated from the turntable 7 and is thus susceptible to be raised together with the turntable 7. However, the clamper 8 is designed not to be raised beyond a predetermined range of a distance from the tray-stabilizer combined member 1 by the clamper supporting member 23. Accordingly, if the distance between the clamper 8 and the tray-stabilizer combined member 1 exceeds the predetermined range, the clamper 8 is detached from the turntable 7.

Figure 13A:
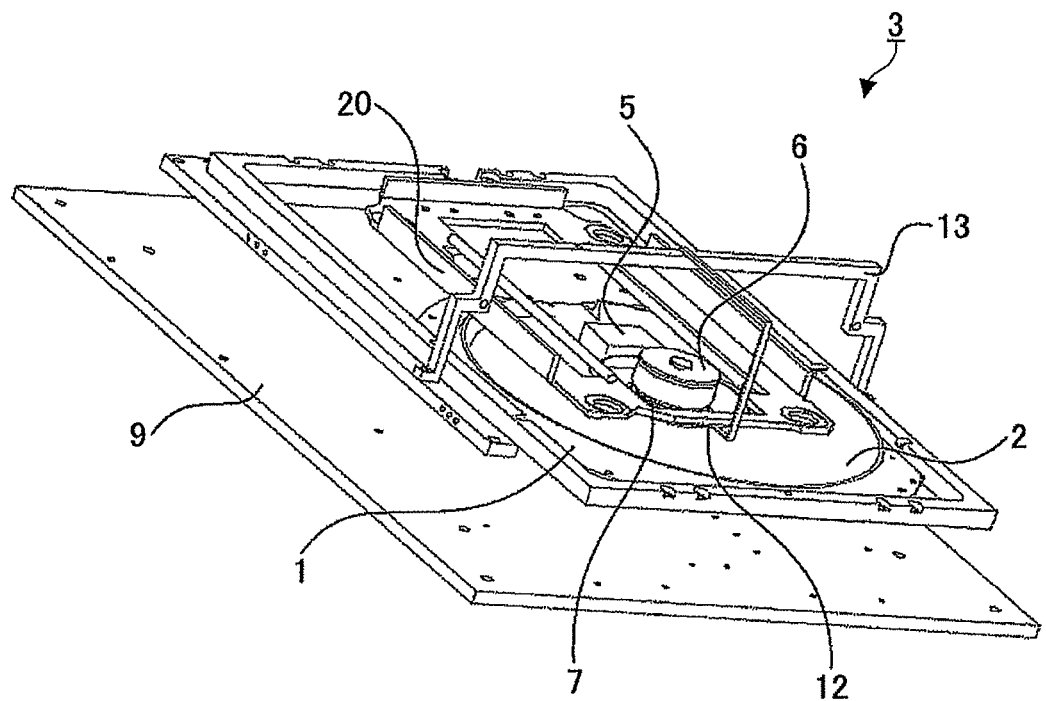
FIGS. 13A and 13B are a perspective view and a sectional view illustrating an operation of a disk unloading member when the thin optical disk rotation is stabilized, and FIGS. 13C and 13D the perspective view and the sectional view illustrating the operation of the disk unloading member when the thin optical disk rotation is stopped.
Figure 13B:
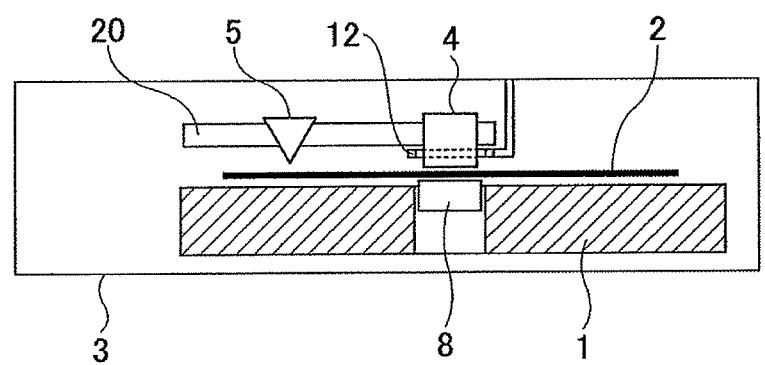
Figure 13C:
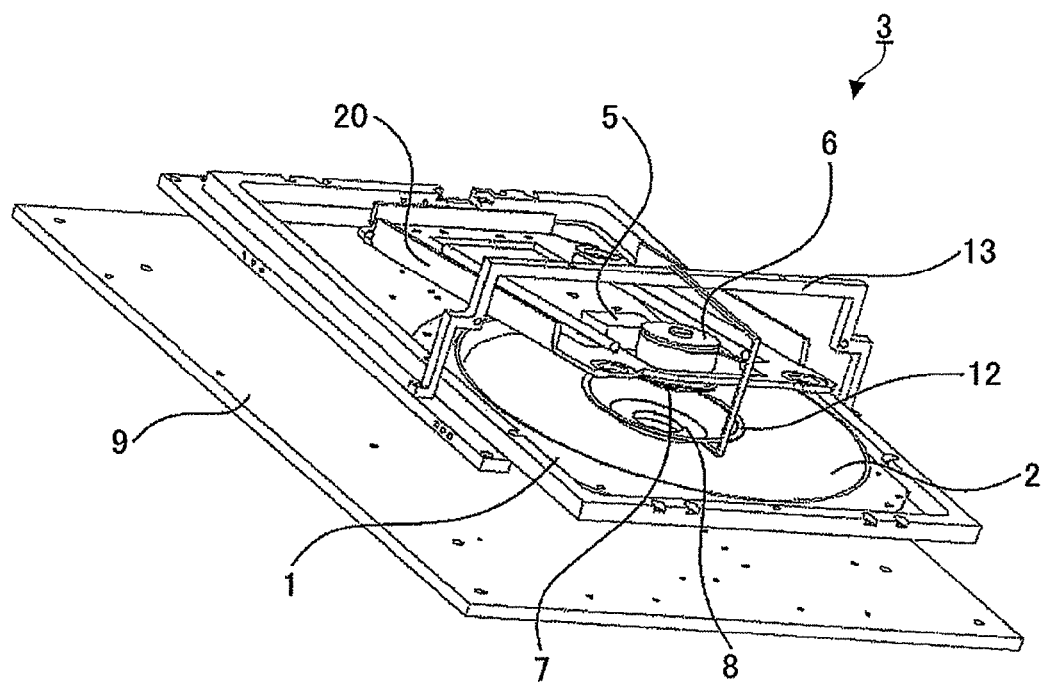
Figure 13D:
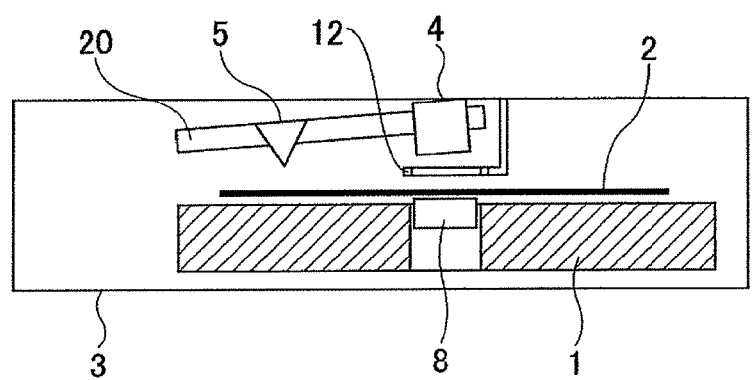
Figure 14:
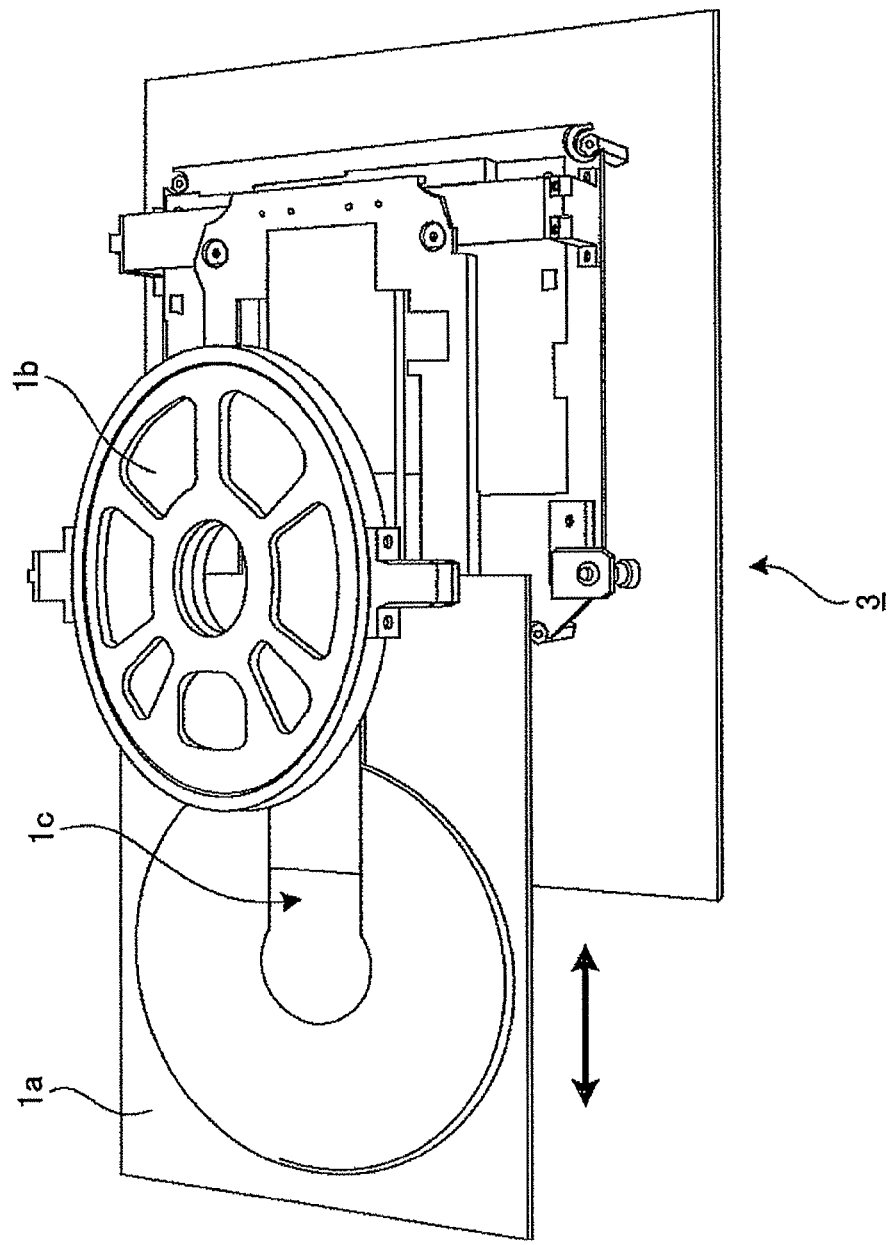
FIG. 14 is a perspective view illustrating a configuration example of a related art disk drive system for the thin optical disk.
Figure 15:
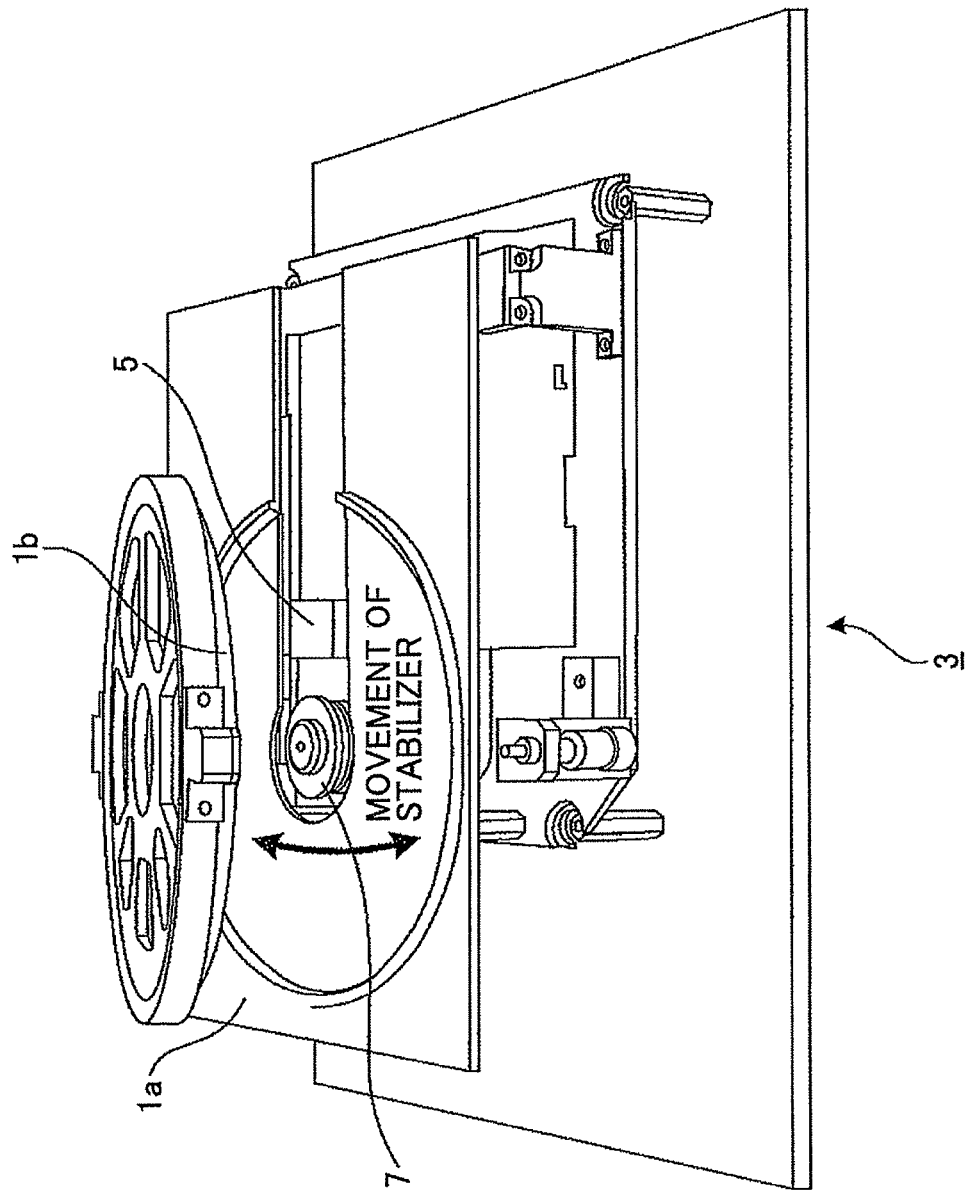
FIG. 15 is a perspective view illustrating operations of a stabilizing plate in the configuration example of the related art disk drive system for the thin optical disk.
Figure 16:
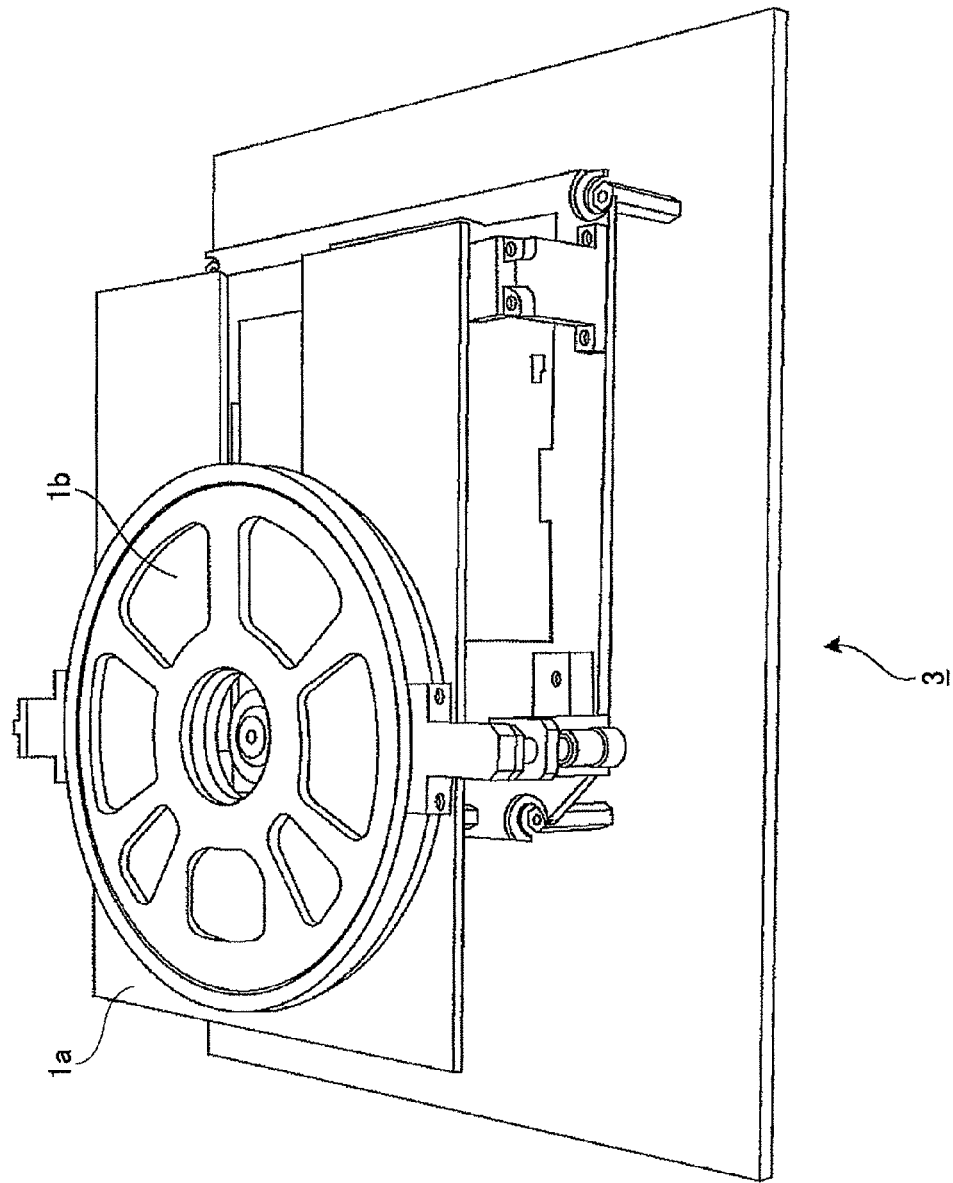
FIG. 16 is a perspective view illustrating the configuration example of the related art disk drive system for the thin optical disk where the thin optical disk is clamped.

As illustrated in FIGS. 13A to 13D, the disk drive system 3 further includes a disk detaching member 12 for detaching the thin optical disk 2 from the turntable 7 when the thin optical disk 2 is unloaded from the disk drive system 3. As illustrated in FIGS. 13A to 13D, the ring-shaped disk detaching member 12 is attached to a fixing component 13 extended from a case 9 so that the disk detaching member 12 is unmovable regardless of moving directions (upward or downward directions) of the base unit 20. As illustrated in FIGS. 13C and 13D, when the clamper 8 is detached from the turntable 7, and the base unit 20 is further moved in an upward direction, the thin optical disk 2 is susceptible to move in the upward direction together with the turntable 7 due to the effect of electrostatic force and the like. At this moment, the fixed disk detaching member 12 hits or abuts the thin optical disk 2 to drop the thin optical disk 2. That is, the fixed disk detaching member 12 hitting the thin optical disk 2 generates sufficient force to cause the thin optical disk 2 to drop.

Accordingly, it may be possible to easily detach the thin optical disk from the turntable 7 to be dropped off onto the tray-stabilizer combined member 1 without having a situation where the thin optical disk 2 is difficult to detach from the turntable 7 due to the light-weight thin optical disk 2.

Note that the disk detaching member 12 is arranged so as not to interrupt the operation of the thin optical disk 2 when the rotation of the thin optical disk 2 clamped between the turntable 7 and the clamper 8 is stopped or stabilized. Note also that the disk detaching member 12 may not be ring-shaped but maybe any shape such as rod-shaped or plate-shaped insofar as the disk detaching member 12 provides sufficient force to drop the thin optical disk 2.

According to the above embodiment, there is provided a disk clamping mechanism including a turntable fixed on a rotational shaft of a spindle motor to rotate a flexible thin optical disk; a stabilizer member configured to suppress a run-out of the flexible thin optical disk by applying an aerodynamic force to the rotating flexible thin optical disk so as to stabilize the run-out of the rotating flexible thin optical disk; and a clamper movably supported in a center of the stabilizer member in a direction perpendicular to a surface of the flexible thin optical disk, where the flexible thin optical disk is sandwiched between the turntable and the clamper so that the turntable and the clamper rotate the flexible thin optical disk sandwiched in-between.

With this configuration, the disk clamping mechanism is capable of making a disk drive system thinner by making the disk clamping mechanism thinner, rotating the flexible thin optical disk while clamping without allowing the flexible thin optical disk to contact the stabilizer member, suppressing a run-out of the rotating flexible thin optical disk by moving the flexible thin optical disk closer to the stabilizer member, thereby stably carrying out recording or reproducing of information on the flexible thin optical disk.

The above disk clamping mechanism further includes a shaft portion provided at a lower part of the clamper to match a center of the clamper for supporting the clamper; and a supporting member configured to pivotally and rotationally support the shaft portion of the clamper, where the clamper that is suspended by the supporting member is attached to the stabilizer member.

In the above disk clamping mechanism, the supporting member includes fixing portions at corresponding ends thereof and is fixed to the stabilizer member via the fixing portions, and the supporting member further includes a round attachment portion in a center thereof to support the clamper via the round attachment portion.

In the above disk clamping mechanism, the shaft portion of the clamper includes a clamper supporting recess portion loosely engaged with the round attachment portion of the supporting member.

In the above disk clamping mechanism, a diameter of the round attachment portion of the supporting member is configured to be larger than a diameter of the clamper supporting recess portion of the clamper including an amount of a rotational drift of the rotational shaft of the clamper obtained while rotating the flexible thin optical disk and to be smaller than a diameter of the shaft portion of the clamper such that the round attachment portion of the supporting member loosely engaging the clamper supporting recess portion of the clamper is not detached therefrom.

With this configuration, the clamper attached to the stabilizer member may be moved in a direction perpendicular to a surface of the flexible thin optical disk, and may also rotate the flexible thin optical disk without detaching from the supporting member.

In the above disk clamping mechanism, the clamper supporting recess portion has a desirable length in a direction perpendicular to a surface of the flexible thin optical disk such that the supporting member is capable of rotationally supporting the clamper via the clamper supporting recess portion, and the flexible thin optical disk sandwiched between the clamper and the turntable is capable of having a predetermined distance from the stabilizer member when the rotation of the flexible thin optical disk is stopped.

In the above disk clamping mechanism, the predetermined distance from the stabilizer member to the flexible thin optical disk sandwiched between the clamper and the turntable is in a range of 1 to 3 mm.

With this configuration, the flexible thin optical disk sandwiched between the clamper and the turntable may be moved in a direction perpendicular to the surface of the flexible thin optical disk, and may be stably rotated without slidably contacting the supporting member.

In the above disk clamping mechanism, the supporting member pivotally and rotationally supporting the shaft portion of the clamper is made of an elastic member, where the elastic member is one of a piano wire and a metallic plate.

In the above disk clamping mechanism, a magnetic member is provided in one or both of the turntable and the clamper that sandwich the flexible thin optical disk.

In the above disk clamping mechanism, a projection portion is provided in a central portion of the turntable and a recess portion is provided in a central portion of the clamper that faces the turntable.

With the above configuration, engagement between the turntable and the clamper that sandwich the thin flexible optical disk may be secured.

According to the embodiment, there is provided a disk drive system including the above disk clamping mechanism, where when the rotation of the flexible thin optical disk is stabilized, the flexible thin optical disk is moved closer to the stabilizer member to suppress the run-out of the flexible thin optical disk such that recording or reproducing of information is stably carried out on the flexible thin optical disk.

With this configuration, since the run-out of the flexible thin optical disk is suppressed and stabilized, recording or reproducing of information is accurately carried out on the flexible thin optical disk in the thin disk drive system.

With this configuration, the disk clamping mechanism is capable of making a disk drive system owing to making the disk clamping mechanism thinner, rotating the flexible thin optical disk while clamping without allowing the flexible thin optical disk to contact the stabilizer member, suppressing the run-out of the rotating flexible thin optical disk by moving the flexible thin optical disk closer to the stabilizer member, thereby accurately carrying out recording or reproducing of information on the flexible thin optical disk with stability.

According to the above embodiment, there is provided a disk drive system including a drive unit including a rotational shaft for holding a flexible thin optical disk and configured to rotate the flexible thin optical disk while holding the flexible thin optical disk; a stabilizer member configured to suppress a run-out of the flexible thin optical disk by applying an aerodynamic force to the rotating flexible thin optical disk such that at least one of recording and reproducing of information is stably carried out on the flexible thin optical disk; and a load/unload mechanism configured to move the stabilizer member arranged beneath the flexible thin optical disk in a direction approximately parallel to a disk placing surface of the stabilizer member while the flexible thin optical disk is placed on the stabilizer member such that the flexible thin optical disk is loaded inside or unloaded outside of the disk drive system.

With this configuration, since a mechanism to load the flexible thin optical disk inside or unload the flexible thin optical disk outside the disk drive system may also be used as a stabilizer member, the disk drive system may be made thinner and loading and unloading of the flexible thin optical disk may also be easily carried out.

The above disk drive system further includes a frame including the drive unit configured to rotate the flexible thin optical disk and an optical pickup configured to carry out recording or reproducing of information on the flexible thin optical disk, where the frame including the drive unit and the optical pickup is arranged above the flexible thin optical disk that faces the stabilizer member.

With this configuration, since a sufficient space may be provided for a disk placing side of the stabilizer member, an effect of aerodynamic force is reliably obtained.

In the above disk drive system, a disk guide is provided on the stabilizer member along an area corresponding to a periphery of the flexible thin optical disk to be placed on the stabilizer member.

With this configuration, the flexible thin optical disk may be loaded or unloaded without dropping off.

In the above disk drive system, the disk guide of the stabilizer member includes a guiding recess portion to allow an optical pickup to move over the disk guide of the stabilizer member such that the optical pickup carries out recording or reproducing of information on the flexible thin optical disk without interruption.

With this configuration, the optical pickup may be moved to carry out recording or reproducing of information on the flexible thin optical disk without interruption.

In the above disk drive system, a clamper is provided in a central portion of the stabilizer member on which the flexible thin optical disk is placed, and is configured to sandwich the flexible thin optical disk between the clamper provided in the central portion of the stabilizer member and a turntable fixed on the rotational shaft of the drive unit.

With this configuration having the stabilizer member combined with a load/unload mechanism, the flexible thin optical disk may be sandwiched between the clamper provided in the central portion of the stabilizer member and the turntable fixed to the rotational shaft of the drive unit.

The above disk drive system further includes a position adjusting mechanism capable of adjusting a relative position between the flexible thin optical disk rotated by the drive unit and the stabilizer member, where when the rotation of the flexible thin optical disk is stabilized after the flexible thin optical disk starts rotating, a distance between the flexible thin optical disk and the stabilizer member is adjusted by causing the position adjusting mechanism to move the flexible thin optical disk.

With this configuration, when the flexible optical disk starts rotating, the flexible optical disk may not slidably contact the stabilizer member, and when the rotation of the flexible optical disk is stabilized, the run-out of the rotated flexible optical disk is suppressed such that recording or reproducing of information may be stably carried out on the flexible optical disk.

The above disk drive system further includes a position adjusting mechanism capable of adjusting a relative position between the flexible thin optical disk rotated by the drive unit and the stabilizer member, where when the rotation of the flexible thin optical disk is stabilized after the flexible thin optical disk starts rotating, a distance between the flexible thin optical disk and the stabilizer member is adjusted by causing the position adjusting mechanism to move the stabilizer member.

With this configuration, when the flexible optical disk starts rotating, the flexible optical disk may not slidably contact the stabilizer member, and when the rotation of the flexible optical disk is stabilized, the run-out of the rotated flexible optical disk is suppressed such that recording or reproducing of information may be stably carried out on the flexible optical disk.

The above disk drive system further includes a lifting unit configured to gradually and alternately lift a left side and a right side of a frame having the drive unit from the stabilizer member when the flexible thin optical disk is unloaded, where the lifting unit detaches the flexible thin optical disk from the rotational shaft of the drive unit that holds the flexible thin optical disk.

With the above configuration, the thin flexible optical disk may be reliably detached from the rotational shaft (including the turntable and the clamper) of the drive unit.

The above disk drive system further includes a disk detaching member fixed to a case of the disk drive system regardless of lifting movements of a frame and configured to detach the flexible thin optical disk from the rotational shaft of the drive unit that holds the flexible thin optical disk when the flexible thin optical disk is unloaded, where while the frame is being lifted, the disk detaching member abuts the flexible thin optical disk to be dropped onto the stabilizer member.

With this configuration, when the frame is lifted while unloading the flexible thin optical disk, the flexible thin optical disk is reliably placed on the stabilizer member by the disk detaching member.

With this configuration, the disk drive system includes a stabilizing member combined with a tray, is capable of being made thinner, suppressing the run-out of the rotating flexible thin optical disk to stably and accurately carry out recording or reproducing of information on the thin optical disk, and easily and reliably loading or unloading the thin optical disk.

The clamping mechanism of the disk drive system according to the above-described embodiment is capable of being made thinner, and rotating the thin optical disk without allowing a stabilizer member to make sliding contact with the thin optical disk, and suppressing the run-out of the thin optical disk by moving the thin optical disk closer to the stabilizer member when the rotation of the thin optical disk is stabilized. Accordingly, recording/reproducing of information may be accurately carried out in the disk drive system having the clamping mechanism according to the embodiment, which may be suitable for use in a recording-reproducing apparatus that carries out recording information on or reproducing information from the flexible thin optical disk.

Further, the disk drive system according to the above-described embodiment includes a stabilizer member combined with a tray, is capable of being made thinner, accurately recording information on or reproducing information from the thin optical disk, and easily and reliably loading or unloading the thin optical disk. Accordingly, the disk drive system according to the above-described embodiment may be suitable for use in a recording-reproducing apparatus that carries out recording information on or reproducing information from the flexible thin optical disk.

Embodiments of the present invention have been described heretofore for the purpose of illustration. The present invention is not limited to these embodiments, but various variations and modifications may be made without departing from the scope of the present invention. The present invention should not be interpreted as being limited to the embodiments that are described in the specification and illustrated in the drawings.

The present application is based on Japanese Priority Applications No. 2009-219038 filed on Sep. 24, 2009, and No. 2009-219051 filed on Sep. 24, 2009, with the Japanese Patent Office, the entire contents of which are hereby incorporated by reference.

What is claimed is:

1. A disk clamping mechanism comprising:
a turntable fixed on a rotational shaft of a spindle motor to rotate a flexible thin optical disk;
a tray-stabilizer combined member configured to suppress a run-out of the flexible thin optical disk by applying an aerodynamic force to the rotating flexible thin optical disk so as to stabilize the run-out of the rotating flexible thin optical disk, and configured to support the flexible thin optical disk during loading and unloading of the flexible thin optical disk; and
a clamper movably supported in a center of the tray-stabilizer combined member in a direction perpendicular to a surface of the flexible thin optical disk,
wherein the flexible thin optical disk is sandwiched between the turntable and the clamper so that the turntable and the clamper rotate the flexible thin optical disk sandwiched therebetween, and
wherein the disk clamping mechanism further comprises: a shaft portion provided at a lower part of the clamper to match a center of the damper for supporting the clamper; and a supporting member configured to pivotally and rotationally support the shaft portion of the clamper, wherein the damper that is suspended by the supporting member is attached to the tray-stabilizer combined member, such that the damper is movable from a first position to a second position relative to the tray-stabilizer combined member, the tray-stabilizer combined member is configured to support the flexible thin optical disk when the clamper is in the first position, and the clamper is configured to support the flexible thin optical disk when the damper is in the second position.

2. The disk clamping mechanism as claimed in claim 1, wherein the supporting member includes fixing portions at corresponding ends thereof and is fixed to the tray-stabilizer combined member via the fixing portions, and wherein the supporting member further includes a round attachment portion in a center thereof to support the damper via the round attachment portion.

3. The disk clamping mechanism as claimed in claim 2, wherein the shaft portion of the clamper includes a clamper supporting recess portion loosely engaged with the round attachment portion of the supporting member.

4. The disk clamping mechanism as claimed in claim 3, wherein a diameter of the round attachment portion of the supporting member is configured to be larger than a diameter of the clamper supporting recess portion of the clamper including an amount of a rotational drift of the rotational shaft of the damper obtained while rotating the flexible thin optical disk and to be smaller than a diameter of the shaft portion of the damper such that the round attachment portion of the supporting member loosely engaging the damper supporting recess portion of the clamper is not detached therefrom.

5. The disk clamping mechanism as claimed in claim 3, wherein the clamper supporting recess portion has a length in a direction perpendicular to a surface of the flexible thin optical disk such that the supporting member is capable of rotationally supporting the damper via the damper supporting recess portion, and the flexible thin optical disk sandwiched between the damper and the turntable is capable of having a predetermined distance from the tray-stabilizer combined member when the rotation of the flexible thin optical disk is stopped.

6. The disk clamping mechanism as claimed in claim 5, wherein the predetermined distance from the tray-stabilizer combined member to the flexible thin optical disk sandwiched between the damper and the turntable is in a range of 1 to 3 mm.

7. The disk clamping mechanism as claimed in claim 1, wherein the supporting member pivotally and rotationally supporting the shaft portion of the clamper is made of an elastic member, and wherein the elastic member is one of a piano wire and a metallic plate.

8. The disk clamping mechanism as claimed in claim 1, wherein a magnetic member is provided in one or both of the turntable and the damper that sandwich the flexible thin optical disk.

9. The disk clamping mechanism as claimed in claim 1, wherein a projection portion is provided in a central portion of the turntable and a recess portion is provided in a central portion of the clamper that faces the turntable.

10. A disk drive system comprising: the disk clamping mechanism as claimed in claim 1, wherein when the rotation of the flexible thin optical disk is stabilized, the flexible thin optical disk is moved closer to the tray-stabilizer combined member to suppress the run-out of the flexible thin optical disk such that recording or reproducing of information is stably carried out on the flexible thin optical disk.

* * * * *